(12) United States Patent
Douglas et al.

(10) Patent No.: US 11,285,605 B2
(45) Date of Patent: Mar. 29, 2022

(54) END EFFECTOR FOR ENGAGING THE FLEXIBLE PACKAGING MATERIALS OF PARCELS

(71) Applicant: Material Handling Systems, Inc., Mt. Washington, KY (US)

(72) Inventors: Josiah Douglas, Louisville, KY (US); Zachary David Klocke, Erlanger, KY (US); Brady Isaac Spalding, Lebanon, KY (US); Justin Tyler Johnson, Medina, OH (US); Lucas Daniel Tobergte, Hebron, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 247 days.

(21) Appl. No.: 16/794,516

(22) Filed: Feb. 19, 2020

(65) Prior Publication Data

US 2020/0262070 A1 Aug. 20, 2020

Related U.S. Application Data

(60) Provisional application No. 62/807,313, filed on Feb. 19, 2019.

(51) Int. Cl.
*B25J 9/16* (2006.01)
*B25J 15/00* (2006.01)
(Continued)

(52) U.S. Cl.
CPC ........... *B25J 9/1669* (2013.01); *B25J 9/0015* (2013.01); *B25J 15/0038* (2013.01);
(Continued)

(58) Field of Classification Search
CPC .... B25J 9/1669; B25J 9/0015; B25J 15/0038; B25J 15/0066; B25J 15/0616; B25J 15/02;
(Continued)

(56) References Cited

U.S. PATENT DOCUMENTS

| 4,578,013 A | 3/1986 | Barillec et al. |
| 9,827,677 B1 * | 11/2017 | Gilbertson ........... B25J 15/0014 |

(Continued)

FOREIGN PATENT DOCUMENTS

| EP | 3566984 A1 * | 11/2019 | ............ B25J 19/022 |
| WO | 2016-090012 A1 | 6/2016 | |

OTHER PUBLICATIONS

Korean Intellectual Property Office, International Search Report and Written Opinion issued in corresponding Application No. PCT/US2020/018735, dated Jun. 22, 2020.

*Primary Examiner* — Stephen A Vu
(74) *Attorney, Agent, or Firm* — Stites & Harbison, PLLC; David W. Nagle, Jr.; Gary N. Stewart

(57) ABSTRACT

An end effector for engaging flexible packaging materials includes a frame, along with a first and second wheel mounted for rotation with respect to the frame. The first wheel and the second wheel are mounted to the frame relative to each other so that the outer surfaces of the two wheels are positioned opposite of each other. The first wheel and the second wheel can be driven in opposing directions to effectively define a roller intake which can be used to draw the flexible packaging materials of a target parcel between the first wheel and the second wheel. The end effector of the present invention can be combined with a robot to provide an improved system for engaging the flexible packaging materials of a parcel.

23 Claims, 13 Drawing Sheets

(51) Int. Cl.
  *B25J 9/00* (2006.01)
  *B25J 19/02* (2006.01)
  *B65G 47/91* (2006.01)
  *B25J 15/06* (2006.01)

(52) U.S. Cl.
  CPC ....... *B25J 15/0066* (2013.01); *B25J 15/0616* (2013.01); *B25J 19/02* (2013.01); *B25J 19/021* (2013.01); *B65G 47/918* (2013.01); *B65G 2201/0285* (2013.01); *B65G 2203/042* (2013.01); *B65G 2203/044* (2013.01)

(58) Field of Classification Search
  CPC ....... B25J 19/02; B25J 19/021; B65G 47/918; B65G 47/917; B65G 2201/0285; B65G 2203/042; B65G 2203/044
  See application file for complete search history.

(56) References Cited

U.S. PATENT DOCUMENTS

| | | | |
|---|---|---|---|
| 10,011,022 B1* | 7/2018 | Lin | B25J 15/0061 |
| 10,646,898 B2 | 5/2020 | Hillerich, Jr. et al. | |
| 2004/0075288 A1 | 4/2004 | Baker | |
| 2011/0048650 A1* | 3/2011 | Lawson | B60C 25/05 157/16 |
| 2018/0051780 A1* | 2/2018 | Shelton, IV | A61B 34/71 |
| 2019/0145798 A1* | 5/2019 | Kamiya | G01D 5/2405 700/258 |

* cited by examiner

END EFFECTOR FOR ENGAGING THE FLEXIBLE PACKAGING MATERIALS OF PARCELS

CROSS-REFERENCE TO RELATED APPLICATIONS

The present application claims priority to U.S. Patent Application Ser. No. 62/807,313 filed Feb. 19, 2019, the entire disclosure of which is incorporated herein by reference.

BACKGROUND OF THE INVENTION

The present invention relates to end effectors that are useful for engaging parcels in flexible packaging materials within a sorting or similar facility.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the various parcels within the facility.

One such piece of equipment useful for sorting the various parcels is an end effector, which can be attached to a robot and maneuvered to grasp or engage the parcels that are placed on the conveyers of the systems. In this regard, a number of different systems utilizing different end effectors exist in the art. For example, one such system is described in U.S. Patent Application Publication No. 2018/0345324, which is incorporated herein by reference, in which an end effector with a number of vacuum cups is attached to a robot for engaging parcels. However, as the parcels moving through a given sorting facility have a number of different shapes and sizes and are in packaging ranging from rigid cardboard boxes to flexible plastic ("poly") bags or other flexible materials, current end effectors are generally not capable of or are not readily configured to effectively and adequately grasp or engage each and every type of parcel. For example, vacuum-based end effectors of known construction may be unable to sufficiently grasp flexible plastic ("poly") bags or similar parcels in flexible packaging materials that may have a wrinkled or non-uniform surface.

Accordingly, there remains a need for improvements in end effectors for effectively engaging the flexible packaging materials of parcels.

SUMMARY OF THE INVENTION

The present invention is an end effector for engaging the flexible packaging materials of parcels. The end effector of the present invention can be combined with a robot, or a portion thereof, to provide an improved system for engaging the flexible packaging materials of parcels.

An end effector for engaging the flexible packaging materials of parcels generally includes a frame, a first wheel mounted for rotation with respect to the frame, and a second wheel mounted for rotation with respect to the frame. Each wheel has an outer surface for engaging a target parcel. The first wheel and the second wheel are mounted to the frame relative to each other, such that the outer surfaces of the first wheel and the second wheel are positioned opposite of each other. The first wheel and the second wheel can be driven in opposing directions to effectively define a roller intake which can be used to draw the flexible packaging materials of a target parcel between the first wheel and the second wheel until the target parcel is sufficiently pinched therebetween. In this way, the end effector can effectively grasp the flexible packaging materials of a parcel, which other end effector grasping means, such as vacuum cups, can struggle to sufficiently engage. Once the parcel is grasped by the end effector, the end effector can be repositioned, e.g., by manipulation of a robot to which the end effector is mounted, to transport the parcel to a target destination. Upon reaching the target destination, the first wheel and the second wheel can be driven in the opposite directions as those used to initially draw the flexible packaging material of the target parcel between the first wheel and the second wheel to release the target parcel.

In some embodiments, to facilitate connection between the frame and a robot, either directly or indirectly, and mounting of the first wheel and the second wheel to the frame, the frame can include a base plate and at least one pair of support arms, which extend downwardly from the base plate and to which the first wheel and the second wheel are mounted for rotation.

In some embodiments, the frame includes two pairs of support arms, wherein each wheel is mounted to one support arm of each pair of support arms. In one embodiment, the frame comprises a first frame member, which includes the first pair of support arms, and a second frame member, which includes the second pair of support arms.

In some embodiments, to drive rotation of the first and second wheel, the end effector includes a motor operably connected to at least one of the first wheel and the second wheel. In some embodiments, the end effector includes a single motor, which is operably connected to one of the wheels to drive rotation thereof in a first direction. In such embodiments, the outer surfaces of the first wheel and the second wheel can be placed in contact with each other so that rotation of the wheel that is operably connected to the motor in a first direction causes the other wheel to rotate in the opposite direction. To reduce the overall size of the end effector, in one embodiment, the motor is a hub motor integrated in one of the wheels. In other embodiments, the first wheel and the second wheel are operably connected to two separate motors, which independently drive the first wheel and the second wheel in opposing directions.

In some embodiments, to provide additional surface area to engage a target parcel, at least one of the wheels may be comprised of a plurality of sub-wheels.

In some embodiments, the spacing between the first wheel and the second wheel is adjustable. To facilitate adjustment of the spacing between the first wheel and the second wheel, in some embodiments, the support arms supporting at least one of the wheels are adjustably secured to the base plate of the frame. In other embodiments, the spacing of the first wheel and the second wheel can be adjusted by, and the end effector can further include, one or more tensioning rods, which can be tensioned to draw the support arms supporting the first wheel and the second wheel closer together. To account for the decreased spacing between the support arms supporting the first wheel and the second wheel, the base plate of the frame may include one or more central portions which are configured to flex in response to tensioning of the one or more tensioning rods.

In some embodiments, to detect the proximity of parcels relative to the end effector, the end effector further includes one or more sensors, such as a photoelectric sensor or ultrasonic sensor. In some embodiments, the end effector includes a first sensor configured to detect the presence of a parcel when positioned along a horizontal axis extending generally parallel to a bottom surface of the base plate of the frame, and a second sensor configured to detect the presence of a parcel when positioned along vertical axis extending generally perpendicular to a bottom surface of the frame. The first sensor is positioned about the end effector, such that the first sensor detects when a parcel grasped by the end effector reaches a predetermined position between the first wheel and the second wheel. The first sensor and the second sensor can be operably connected to a controller to provide a control subsystem which can be used to regulate engagement of each motor in the end effector based on input from the first sensor and the second sensor. In some embodiments, the control subsystem can be operably connected to a robot control system configured to control movement of a robot to which the end effector is mounted, thus informing movement of the end effector.

In some embodiments, the end effector also includes one or more vacuum cups for engaging for engaging cardboard boxes or other parcels with rigid packaging materials, thus providing an additional means for grasping parcels. Each vacuum cup is connected to the frame and is configured to be placed in fluid communication with a vacuum source.

DESCRIPTION OF THE INVENTION

The present invention is an end effector for engaging the flexible packaging materials of a parcel. The end effector of the present invention can be combined with a robot to provide an improved system for engaging the flexible packaging materials of a parcel.

Figure 1:
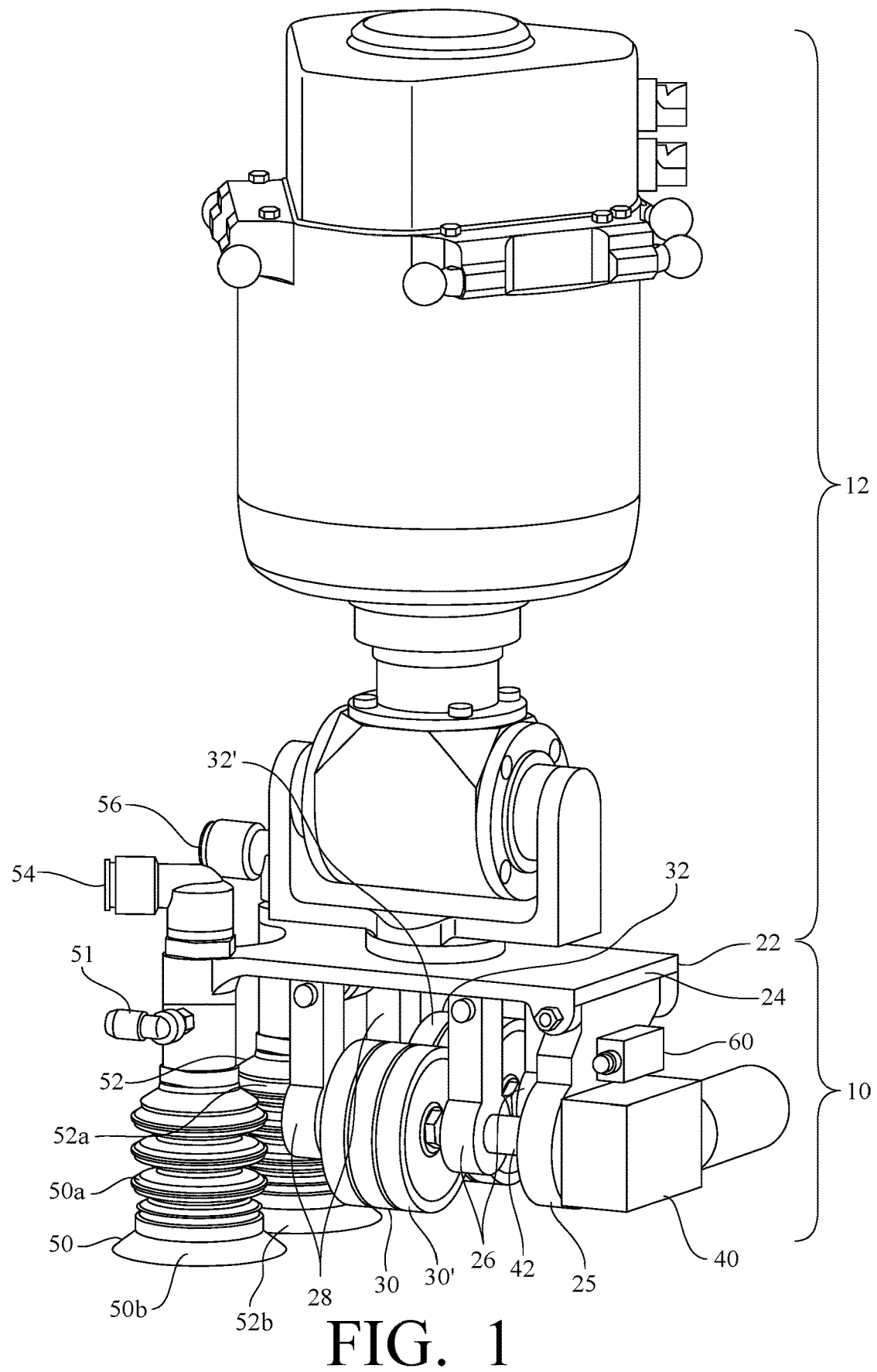
FIG. 1 is a perspective view of an exemplary end effector for engaging the flexible packaging materials of a parcel made in accordance with the present invention mounted to a portion of a robot.

FIG. 1 is a perspective view of an exemplary end effector 10 for engaging the flexible packaging materials of parcels made in accordance with the present invention mounted to a portion of a robot 12. It should be appreciated that the portion of the robot 12 shown in FIG. 1 may be a component, such as a robotic arm, of a larger robot or robotic system, which is configured to move the end effector 10 to selectively engage parcels. For example, the portion of the robot 12 may be a component of a Delta P6 robot manufactured by Schneider Electric and available, for instance, from Advantage Industrial Automation of Duluth, Ga. As further discussed below with reference to FIG. 11, movement of such a robot can be, in some embodiments, regulated, at least in part, by a robot control system and control subsystem to which the robot is operably connected.

FIGS. 2-5 are various views of the exemplary end effector 10 of FIG. 1, but with the portion of the robot 12 and, in some cases, certain components of the end effector 10 hidden from view to better illustrate features of the end effector 10.

Referring now to FIGS. 1-5, the exemplary end effector 10 includes a frame 22 to which a first wheel 30 and a second wheel 32 are each mounted for rotation. The frame 22 includes a base plate 24, which, in this exemplary embodiment, defines a plurality of openings 24a, 24b through which corresponding bolts may pass to bolt the end effector 10 to the portion of the robot 12, although alternative fastening means may, of course, be used without altering the operating principle of the end effector 10.

Referring still to FIGS. 1-5, the first wheel 30 and the second wheel 32 each have an outer surface 30', 32' for engaging a target parcel. To effectively grasp parcels in the manner described below, the first wheel 30 and the second wheel 32 are mounted to the frame 22 relative to each other, such that the outer surface 30' of the first wheel 30 and the outer surface 32' of the second wheel 32 are opposite each other. The first wheel 30 and the second wheel 32 are each mounted below and spaced apart from the base plate 24 to prevent the base plate 24 from obstructing rotation of the respective wheels 30, 32. To this end, in this exemplary embodiment, the frame 22 further includes at least one pair of support arms 26, 28, to which the first wheel 30 and the second wheel 32 are mounted for rotation. In this exemplary embodiment, the frame 22 includes two pairs of support arms 26, 28: a first pair of support arms 26 including a first support arm 26a and a second support arm 26b; and a second pair of support arms 28 including a third support arm 28a and a fourth support arm 28b.

Each respective support arm 26a, 26b, 28a, 28b extends downwardly from the base plate 24 of the frame 22 and includes a proximal end secured to the base plate 24 and a distal end to which either the first wheel 30 or the second wheel 32 is rotatably mounted. In this exemplary embodiment, the first wheel 30 is rotatably mounted to the first support arm 26a and the third support arm 28a by a first shaft 34 extending through the center of first wheel 30 and between the first support arm 26a and the third support arm 28a. Similarly, the second wheel 32 is rotatably mounted to the second support arm 26b and the fourth support arm 28b by a second shaft 36 extending through the center of the second wheel 32 and between the second support arm 26b and the fourth support arm 28b. In this exemplary embodiment, the first and second wheel 30, 32 are mounted to the first shaft 34 and the second shaft 36, respectively, using a first shaft adapter 35 and a second shaft adapter 37. Each respective support arm 26a, 26b, 28a, 28b extends downwardly from the base plate 24 of the frame 22 to provide sufficient spacing between the base plate 24 of the frame 22 and the first and second wheel 30, 32 to permit rotation thereof. Of course, the first wheel 30 and the second wheel 32 can be mounted to the frame 22 in alternative manners without altering the operating principle of the end effector 10. For example, in some embodiments, the frame 22 can include a single pair of support arms, to which the first and second wheel 30, 32 are respectively mounted or, alternatively, a single bracket component extending downwardly from the base plate 24 to which both the first wheel 30 and the second wheel 32 are mounted.

Referring now to FIGS. 1-3 and 5, the end effector 10 further includes a motor 40 operably connected to the first wheel 30 to drive rotation thereof. In this exemplary embodiment, the motor 40 is operably connected to the first wheel 30 via a mechanical linkage between a shaft adapter 42 associated with the motor 40 and the first shaft 34 extending through the first wheel 30. To permit such linkage, the distal end of the first support arm 26a of the first pair of support arms 26 defines a central opening through which the first shaft 34 or the shaft adapter 42 may pass, or in which the first shaft 34 or the shaft adapter 42 may link. The motor 40 may, of course, be operably connected to the first wheel 30 in alternative manners (e.g., by way of a belt connection) to drive rotation of the first wheel 30. In this exemplary embodiment, the frame 22 further includes a bracket 25 to which the motor 40 is mounted, which operably connects the motor 40 to the base plate 24 of the frame 22. In addition to the motor 40, in some embodiments, the bracket 25 also serves to support a first sensor 60, as further described below.

Figure 4:
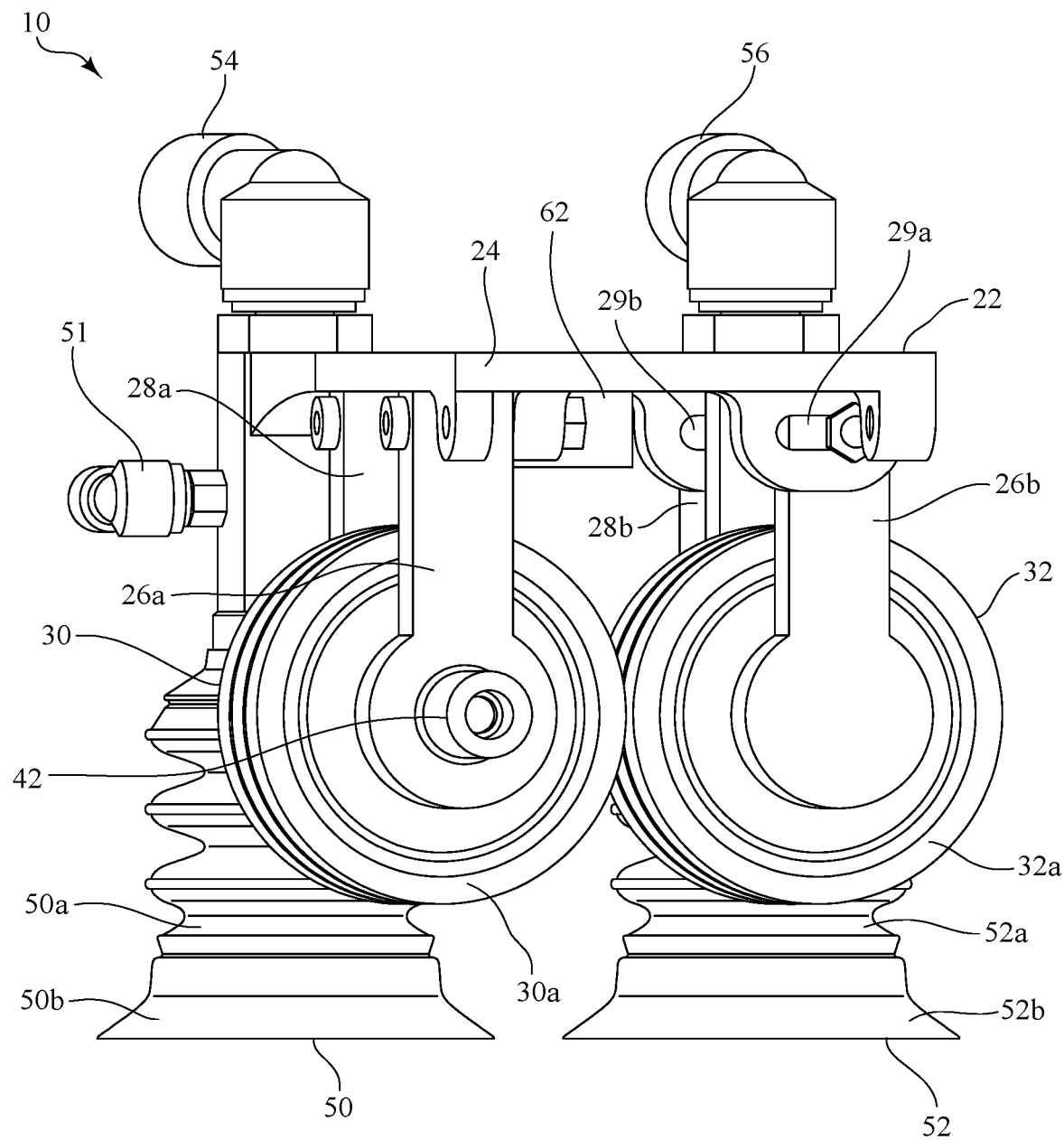
FIG. 4 is a right-side perspective view of the exemplary end effector of FIG. 2, with certain components hidden from view for clarity.

Referring again to FIGS. 1-5, in order to drive rotation of the second wheel 32 as the motor 40 drives rotation of the first wheel 30, the outer surface 30' of the first wheel 30 is placed in contact with the outer surface 32' of the second wheel 32. In FIG. 4, the bracket 25, the motor 40, and the first sensor 60, have each been hidden from view. As the motor 40 drives the first wheel 30 in a first direction (e.g., counterclockwise), the contact between the outer surface 30' of the first wheel 30 and the outer surface 32' of the second wheel 32 causes the second wheel 32 to rotate in a second direction (e.g., clockwise) that is opposite the first direction. The second wheel 32 can thus be slave-driven by the first wheel 30 to cause the first wheel 30 and the second wheel 32 to simultaneously rotate in opposing directions. As the flexible packaging material of a parcel contacts the outer surface 30', 32' of either the first wheel 30 or the second wheel 32, the parcel is thus urged toward the outer surface 30', 32' of the other wheel 30, 32. Because the first wheel 30 and the second wheel 32 are simultaneously rotating in opposing directions, movement of the outer surfaces 30', 32' of the first and second wheel 30, 32 acts to pull the flexible packaging material upward and between the first wheel 30 and the second wheel 32. In this way, the first wheel 30 and the second wheel 32 effectively provide a roller intake, which can be used to draw the flexible packaging material of a parcel between the first wheel 30 and the second wheel 32.

As the flexible packaging material of the parcel is drawn upwardly and between the first wheel 30 and the second wheel 32, the flexible packaging material of the parcel is effectively pinched, and thus grasped, by the end effector 10. Once the parcel is so grasped by the end effector 10, a robot carrying the end effector 10 can be manipulated to transport the parcel to a target destination. Upon reaching the target destination, the rotation of the first wheel 30 and the second wheel 32 can be reversed to release the parcel. In this regard, the motor 40 can be engaged to rotate the first wheel 30 in the opposite direction (i.e., the second direction or clockwise in the above example). Again, as a result of the contact between the outer surface 30' of the first wheel 30 and the outer surface 32' of the second wheel 32, this also causes the second wheel 32 to rotate in the opposite direction (i.e., the first direction or counterclockwise in the above example). To permit rotation of the first wheel 30 in both directions (counterclockwise and clockwise), the motor 40 is preferably a bi-directional motor.

As a further refinement, in this exemplary embodiment, the motor 40 is a worm-gear motor, which is configured to cease engagement, and thus rotation of the first wheel 30, when the parcel reaches a defined position between the first wheel 30 and the second wheel 32, such that the parcel is not released from the end effector 10 until the worm gear motor is reversed. It should be appreciated, however, that other suitable types of motors could be utilized and still enable the end effector 10 to effectively grasp the flexible packaging materials of parcels. Irrespective of the choice of motor, operation of the motor 40 may be regulated by a control subsystem, as further described below with reference to FIGS. 11 and 12.

Figure 5:
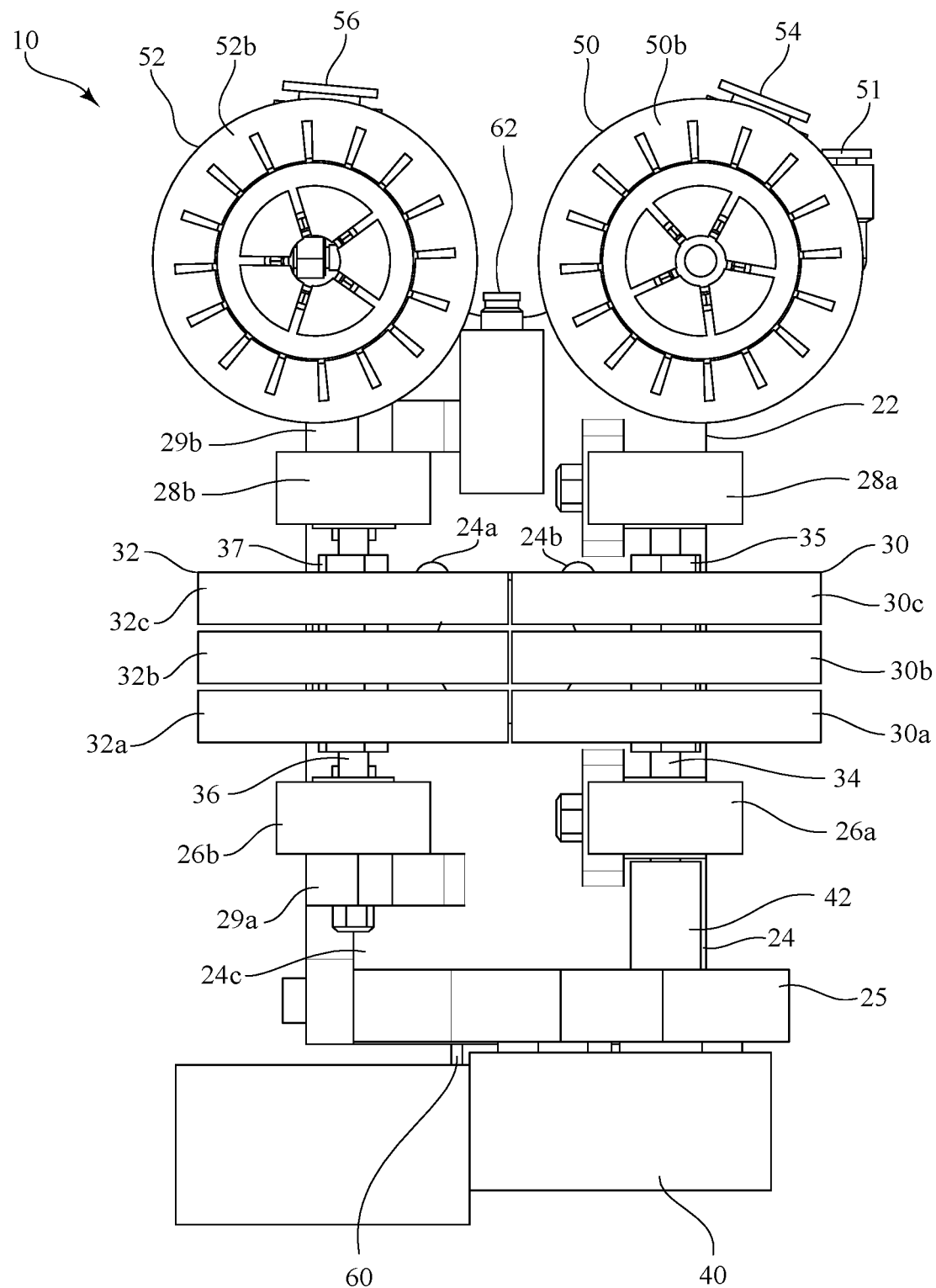
FIG. 5 is a bottom view of the exemplary end effector of FIG. 2.

Referring still to FIGS. 1-5, in this exemplary embodiment, in order to provide additional surface area to grip a target parcel, the first wheel 30 is comprised of a plurality of sub-wheels, and the second wheel 32 is similarly comprised of a plurality of sub-wheels. Specifically, in this exemplary embodiment, the first wheel 30 is comprised of three sub-wheels 30a, 30b, 30c, each having an outer surface for engaging the flexible packaging materials of a parcel, as perhaps best shown in FIG. 5. Similarly, the second wheel 32 is comprised of three sub-wheels 32a, 32b, 32c, each having an outer surface for engaging the flexible packaging materials of a parcel, as also shown in FIG. 5. Thus, in this exemplary embodiment, the outer surfaces of sub-wheels 30a, 30b, 30c collectively define the outer surface 30' of the first wheel 30 for engaging the flexible packaging materials of a parcel, and the outer surfaces of sub-wheels 32a, 32b, 32c collectively define the outer surface 32' of the second wheel 32 for engaging the flexible packaging materials of a parcel. To prevent friction between adjacent sub-wheels 30a, 30b, 30c, 32a, 32b, 32c of each respective wheel 30, 32, the sub-wheels 30a, 30b, 30c of the first wheel 30 are preferably spaced apart from one another about the first shaft 34, and the sub-wheels 32a, 32b, 32c of the second wheel 32 are preferably spaced apart from one another about the second shaft 36. The sub-wheels 30a, 30b, 30c defining the first wheel 30 are fixed to the first shaft 34, such that the sub-wheels 30a, 30b, 30c associated with the first shaft 34 rotate in unison with each other. Similarly, the sub-wheels 32a, 32b, 32c defining the second wheel 32 are fixed to the second shaft 36, such that the sub-wheels 32a, 32b, 32c associated with the second shaft 36 rotate in unison with each other. In some embodiments, each sub-wheel 30a, 30b, 30c, 32a, 32b, 32c may be made from a compliant material, such as polyurethane with a shore A30 hardness, which will deform in the response to pressure to better permit the flexible packaging materials of a target parcel to be drawn between the first wheel 30 and the second wheel 32 during operation.

Referring now to FIGS. 4 and 5, in this exemplary embodiment, the support arms 26a, 28a supporting the first wheel 30 and/or the support arms 26b, 28b supporting the second wheel 32 are adjustably secured to the base plate 24 of the frame 22. In this exemplary embodiment, each support arm 26b, 28b supporting the second wheel 32 is adjustably secured to the base plate 24 of the frame 22. To this end, the base plate 24 of the frame 22 defines a first slot 29a and a second slot 29b to which the proximal end of the second support arm 26b of the first pair of support arms 26 and the proximal end of the fourth support arm 28b of the second pair of support arms 28, respectively, are secured by a bolt or similar fastener. To adjust the spacing between the first wheel 30 and the second wheel 32, the second support arm 26b and the fourth support arm 28b of the first pair and second pair of support arms 26, 28 can be secured at different positions along the first slot 29a and the second slot 29b. In this way, the positioning of the second support arm 26b and the fourth support arm 28b of the first pair and second pair of support arms 26, 28 can be adjusted to provide space between the first wheel 30 and the second wheel 32, as shown best in FIG. 5, and manually release flexible packaging material pinched between the first wheel 30 and the second wheel 32.

It is generally preferred that the first wheel 30 and the second wheel 32 be in contact during operation of the end effector 10 shown in FIGS. 1-5 in order to prevent slippage of a parcel caused by undesired rotation of the second wheel 32 following the parcel being grasped. However, it is contemplated that some sorting applications may require the sorting of parcels with characteristics (e.g., dimensions or material construction), which enable the end effector 10 to effectively grasp such parcels when the first wheel 30 and the second wheel 32 are not din direct contact. Additionally, the risk of such slippage may be reduced or eliminated by having each wheel 30, 32 driven by separate motors, as further described below with reference to FIG. 6.

Figure 6:
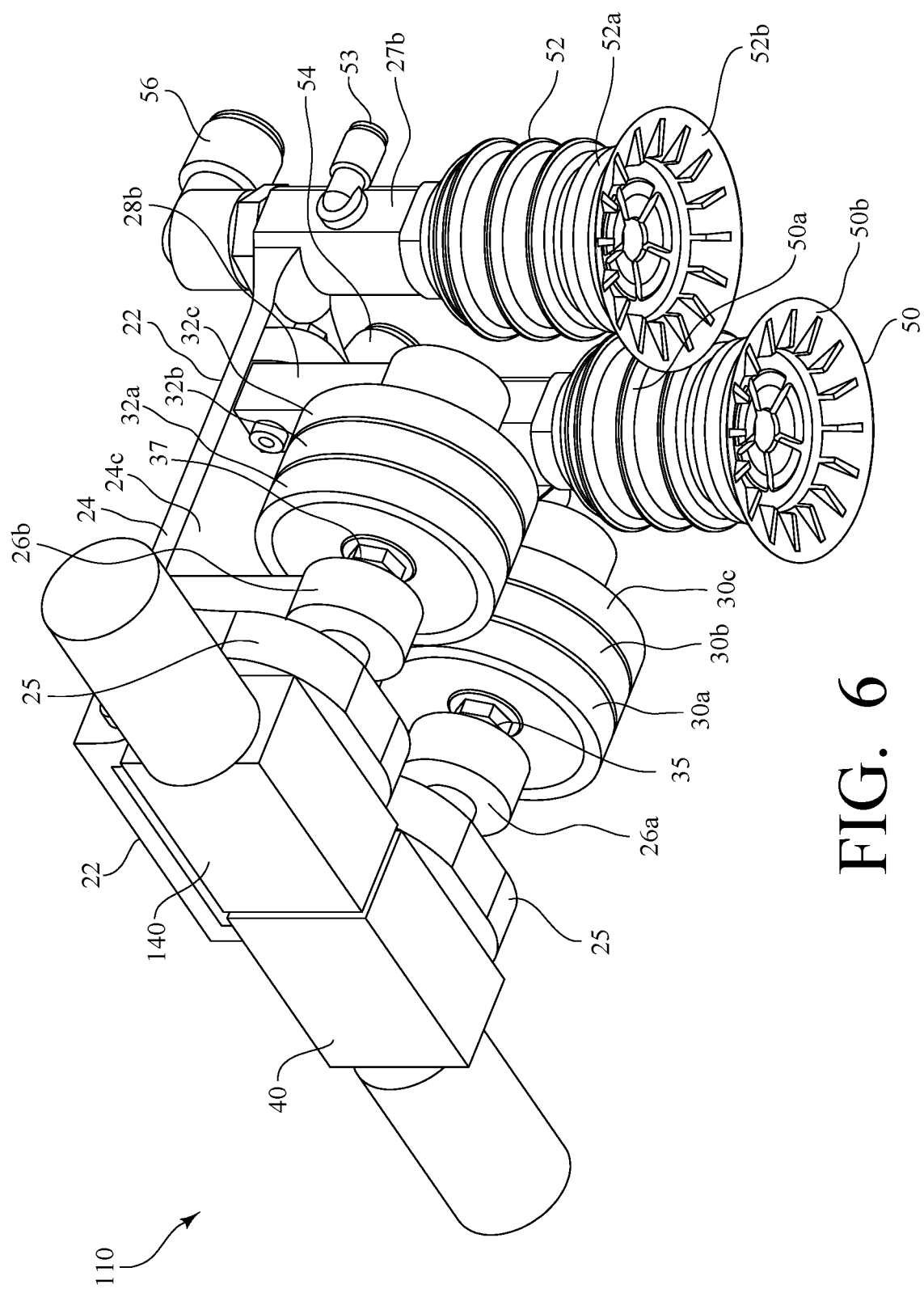
FIG. 6 is a bottom, rear perspective view of another exemplary end effector for engaging the flexible packaging materials of a parcel made in accordance with the present invention.

FIG. 6 is a bottom, rear perspective view of an another exemplary end effector 110, which may be combined with the portion of the robot 12 and used in place of the end effector 10 described above with reference to FIGS. 1-5. In this exemplary embodiment, the end effector 110 includes the same features as the end effector 10 described above with reference to FIGS. 1-5, except that the end effector 110 shown in FIG. 6 includes an additional, second motor 140 operably connected to the second wheel 32. In this exemplary embodiment, to accommodate the second motor 140, the positioning of the motor 40 (or first motor 40) described above has been adjusted, and the bracket 25 has been modified from that shown FIGS. 1-5. In this exemplary embodiment, the first wheel 30 and the second wheel 32 are independently driven by the first motor 40 and the second motor 140, respectively. During operation, when the first motor 40 is driving rotation of the first wheel 30 in a first direction (e.g., counterclockwise), the second motor 140 preferably drives rotation of the second wheel 32 in a second direction (e.g., clockwise) that is opposite of the first direction, thereby enabling the end effector 110 to pull the flexible packaging material of a parcel upward and between the first wheel and the second wheel 30, 32. Such use of the first motor 40 and the second motor 140 to independently drive the first wheel 30 and the second wheel 32 in opposing directions enables the end effector 110 to more effectively grasp and release target parcels even when the outer surface 30' of the first wheel 30 and the outer surface 32' of the second wheel 32 are not in physical contact with one another. Referring still to FIG. 6, in this exemplary embodiment, the second motor 140 is operably connected to the second wheel 32 via a mechanical linkage between a shaft adapter 142 associated with the second motor 140 and the second shaft 36 extending through the second wheel 32. To permit such linkage, the distal end of the second support arm 26b of the first pair of support arms 26 defines a central opening through which the second shaft 36 or the shaft adapter 142 may pass or in which the second shaft 36 or the shaft adapter 142 may link. The second motor 140 may, of course, be operably connected to the second wheel 32 in alternative manners (e.g., by way of a belt connection) to drive rotation of the first wheel 40. In this exemplary embodiment, the bracket 25 is configured to support both the first motor 40 and the second motor 140 relative to the base plate 24 of the frame 22.

Referring still to FIG. 6, like the first motor 40, to permit rotation of the second wheel 32 in both directions (counterclockwise and clockwise), the second motor 140 is preferably a bi-directional motor. Furthermore, like the first motor 40, in this exemplary embodiment, the second motor 140 is a worm-gear motor, which is configured to cease engagement, and thus rotation of the second wheel 32, when the parcel reaches a defined position between the first wheel 30 and the second wheel 32. It should be appreciated, however, that other suitable types of motors could be utilized and still enable the end effector 10 to effectively grasp the flexible packing materials of parcels. Furthermore, irrespective of the choice of motor, operation of the second motor 140 may be regulated by a control subsystem, as further described below with reference to FIGS. 11 and 12.

Referring now again to FIGS. 1-5, to detect the proximity of parcels relative to the end effector 10, in this exemplary embodiment, the end effector 10 further includes one or more sensors 60, 62. Specifically, the end effector 10 includes a first sensor 60 and a second sensor 62, each of which is configured to detect the presence of a parcel.

Figure 2:
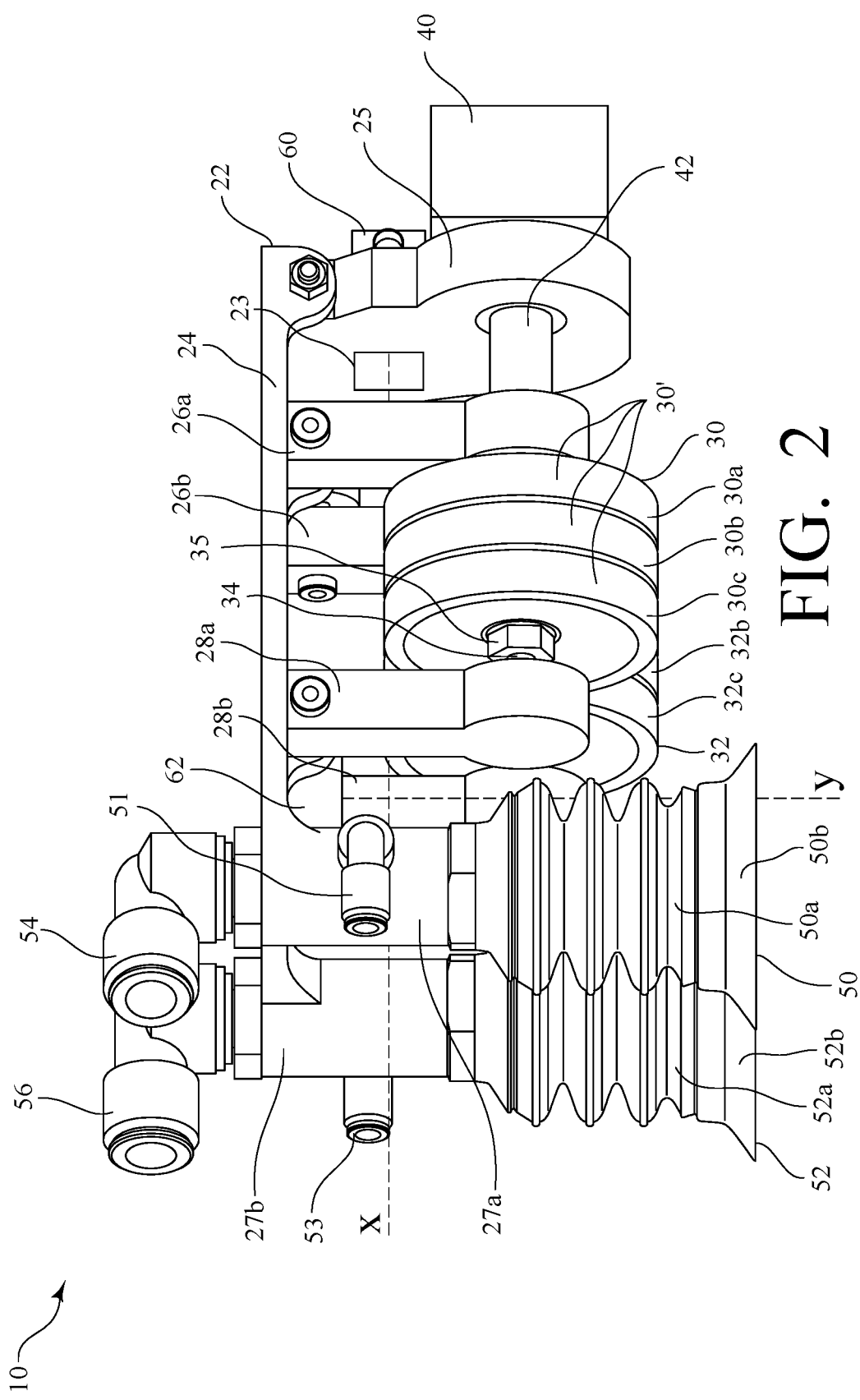
FIG. 2 is a front, left-side perspective view of the exemplary end effector of FIG. 1, with the portion of the robot hidden from view for clarity.
Figure 3:
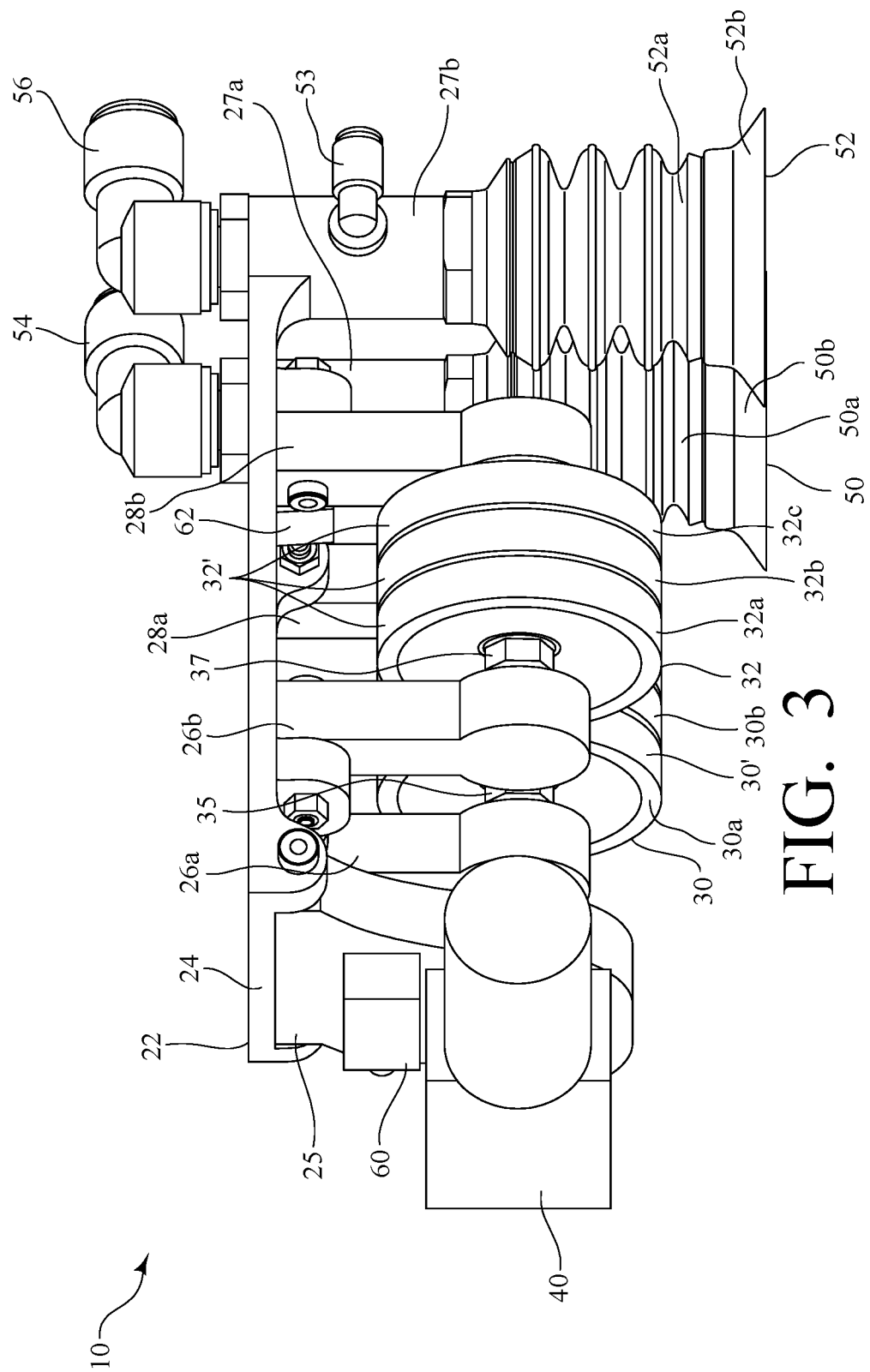
FIG. 3 is a rear, right-side perspective view of the exemplary end effector of FIG. 2.

Referring now specifically to FIG. 2, the first sensor 60 that is configured to detect the presence of a parcel positioned along a horizontal axis, x, extending generally parallel to a bottom surface 24c of the base plate 24 of the frame 22. The second sensor is configured to detect the presence of a parcel positioned along a vertical axis, y, extending generally perpendicular to the bottom surface 24c of the base plate 24 of the frame 22. The first sensor 60 is mounted to the bracket 25 of the frame 22 at a position sufficient to detect the presence of the flexible packaging of a parcel between the first wheel 30 and the second wheel 32. In this exemplary embodiment, the bracket 25 includes a window 23, which permits a beam emitted from the first sensor 60 to travel through the bracket 25 between the first wheel 30 and the second wheel 32. The second sensor 62 is mounted to the bottom surface 24c of the base plate 24 of the frame 22 at a position sufficient to detect the presence of a parcel positioned below the end effector 10 in the area where the second sensor 62 is mounted. In this exemplary embodiment, the first sensor 60 and the second sensor 62 are both photoelectric sensors, such as visible light sensors, configured to emit a beam of electromagnetic radiation to detect the presence of a parcel, though other suitable proximity sensors, such as an ultrasonic sensor, could alternatively be used. As further described below with reference to FIGS. 11 and 12, the first sensor 60 and the second sensor 62 may serve as individual components of, and acquire environmental input data for, a control subsystem.

Referring again to FIGS. 1-5, as a further refinement, in this exemplary embodiment, the end effector 10 further includes a first vacuum cup 50 and a second vacuum cup 52 for engaging cardboard boxes or other parcels with rigid packaging materials. As such, the first vacuum cup 50 and the second vacuum cup 52 effectively provide the end effector 10 with a secondary means of grasping parcels.

Each vacuum cup is 50, 52 connected to the frame 22 and includes a bellows 50a, 52a having a proximal end connected to the frame 22 and a distal end to which a lip 50b, 52b of the vacuum cup 50, 52 is connected. The bellows 50a, 52a each effectively define a pathway for the flow of air through the respective vacuum cups 50, 52.

Referring still to FIGS. 1-5, in this exemplary embodiment, the end effector 10 further includes a first connector 54 corresponding to the first vacuum cup 50 and a second connector 56 corresponding to a second vacuum cup 52. Each connector 54, 56 is in fluid communication with the bellows 50a, 52a of the respective vacuum cup 50, 52 to which it corresponds and is configured to connect to a vacuum source (not shown) via a vacuum hose (not shown) to provide suction through the corresponding vacuum cup 50, 52. In this way, the connectors 54, 56 can be selectively connected or disconnected from a vacuum source to independently turn on or off, and thus individually address, the vacuum cups 50, 52. In this exemplary embodiment, the base plate 24 of the frame 22 further defines a first fitting 27a which interconnects the first vacuum cup 50 and the first connector 54, and a second fitting 27b which interconnects the second vacuum cup 52 and the second connector 56. The first fitting 27a has a central opening (not shown) extending therethrough which permits air to flow through the first vacuum cup 50 to the first connector 54. Similarly, the second fitting 27b has a central opening (not shown) extending therethrough which permits air to flow through the second vacuum cup 52 to the second connector 56.

In some embodiments, the end effector 10 may utilize a vacuum sensor (not shown) corresponding to each vacuum cup 50, 52. To this end, and still referring to FIGS. 1-5, the end effector 10 can include a first sensor port 51 corresponding to the first vacuum cup 50 and a second sensor port 53 corresponding to the second vacuum cup. Each sensor port 51, 53 is in fluid communication with the vacuum cup 50, 52 to which it corresponds and is configured to operably connect to a vacuum sensor.

Figure 7:
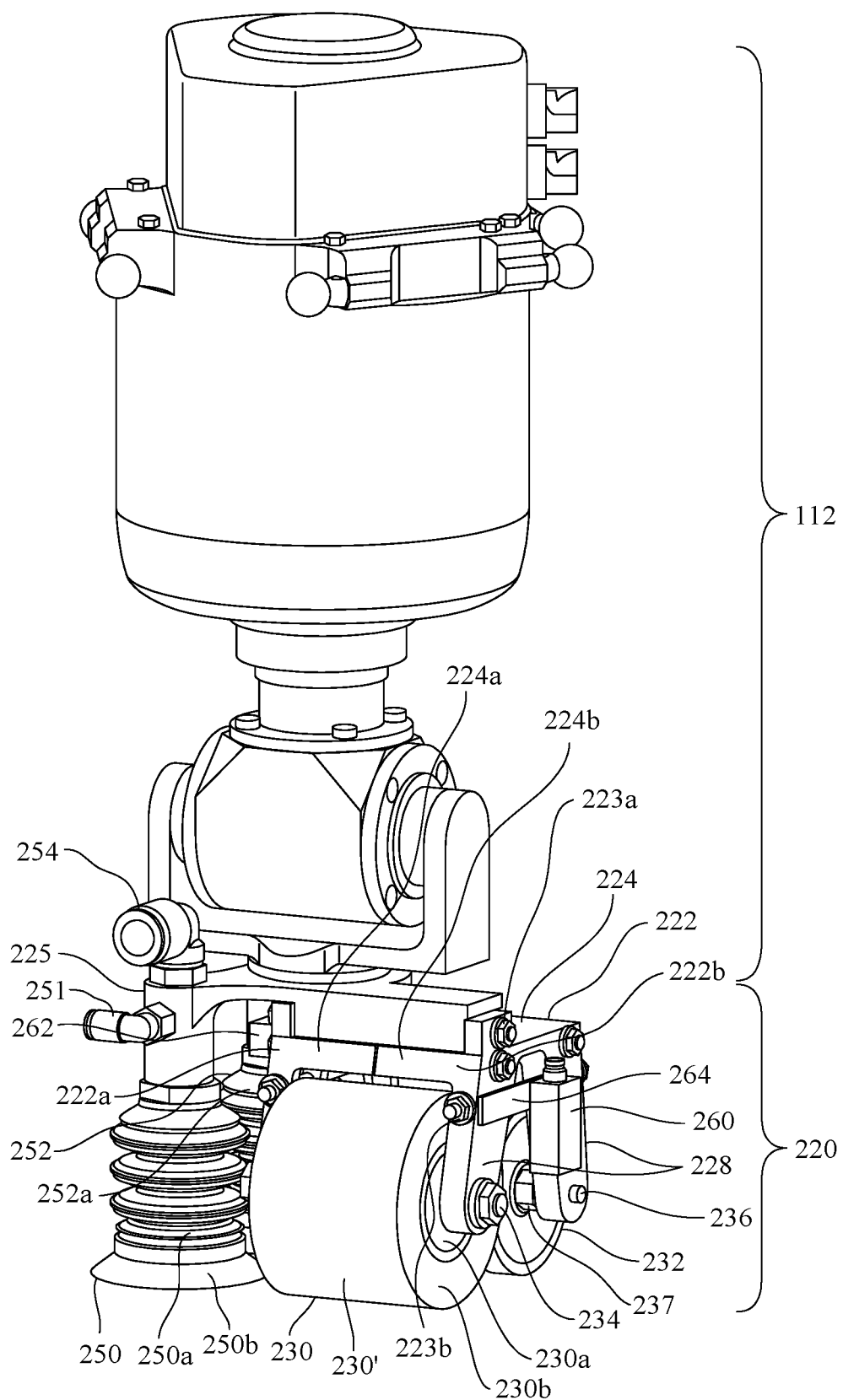
FIG. 7 is a perspective view of another exemplary end effector for engaging parcels made in accordance with the present invention mounted to a portion of a robot.

FIG. 7 is a front perspective view of another exemplary end effector 220 made in accordance with an embodiment of the present invention mounted to a portion of a robot 112. It should be appreciated that the portion of the robot 112 shown in FIG. 7 may be a component, such as a robotic arm, of a larger robot or a robotic system, which is configured to move the end effector 220 to selectively engage parcels. For example, the portion of the robot 112 may be a compound of a Delta P6 robot manufactured by Schneider Electric and available, for instance, from Advantage Industrial Automation of Duluth, Ga. As further discussed below with reference to FIG. 11, movement of such a robot can be, in some embodiments, regulated, at least in part, by a robot control system and a control subsystem to which the robot is operably connected.

Figure 8A:
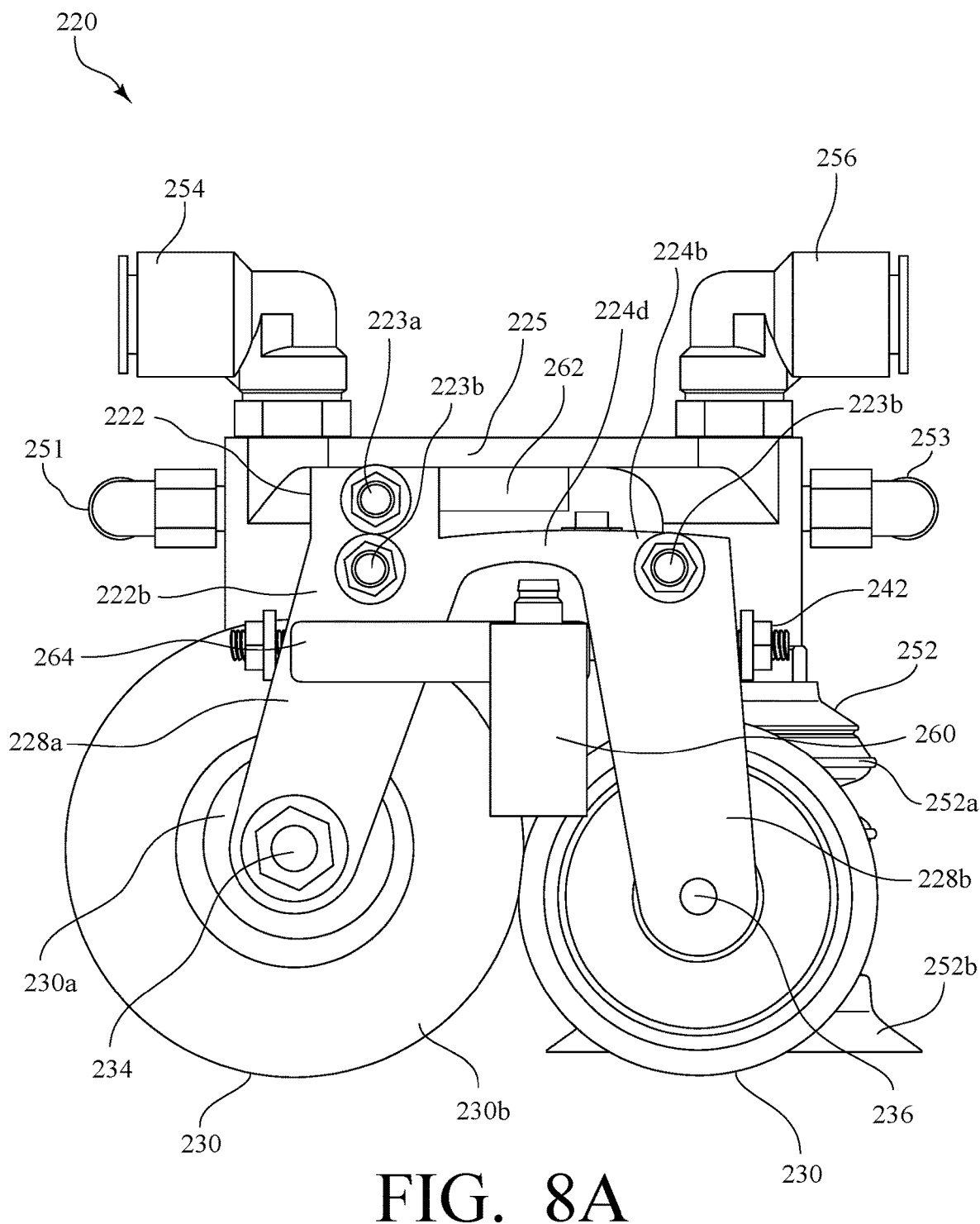
FIG. 8A is a right-side view of the exemplary end effector of FIG. 7, with the portion of the robot hidden from view for clarity.
Figure 8B:
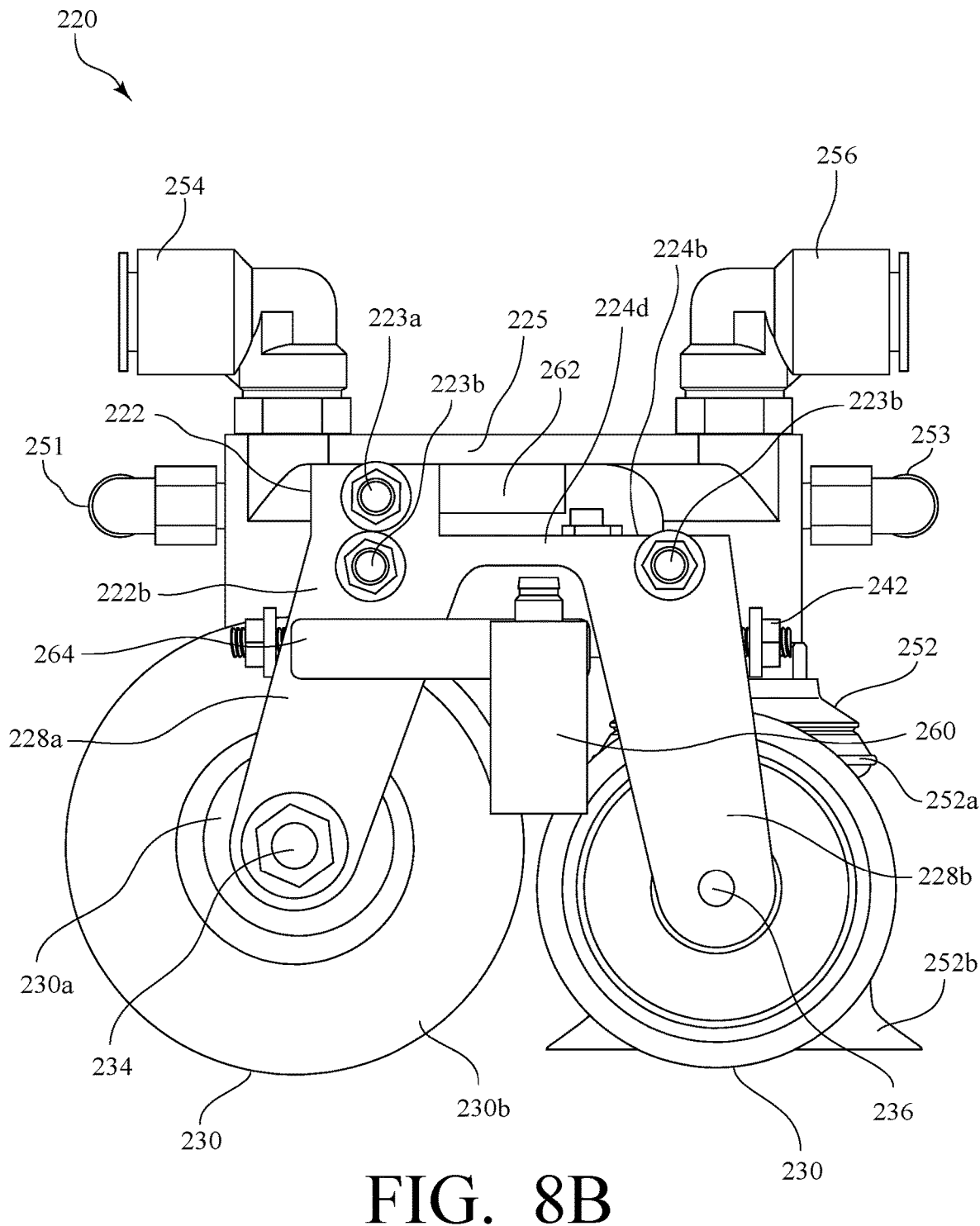
FIG. 8B is another right-side view of the exemplary end effector of FIG. 7, with the portion of the robot hidden from view for clarity.
Figure 9:
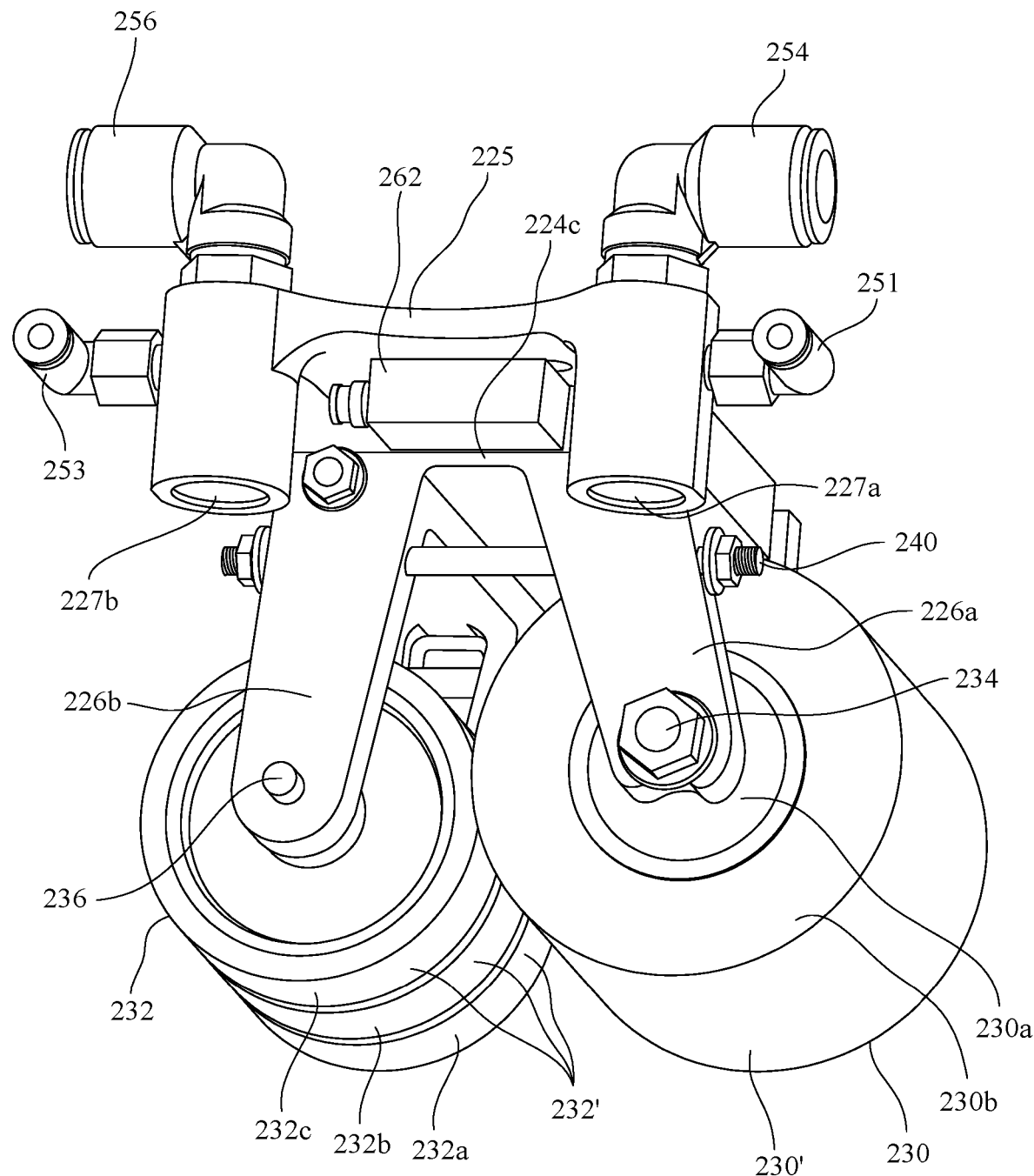
FIG. 9 is a bottom, left perspective view of the exemplary end effector of FIG. 8B, with certain components hidden from view for clarity.
Figure 10:
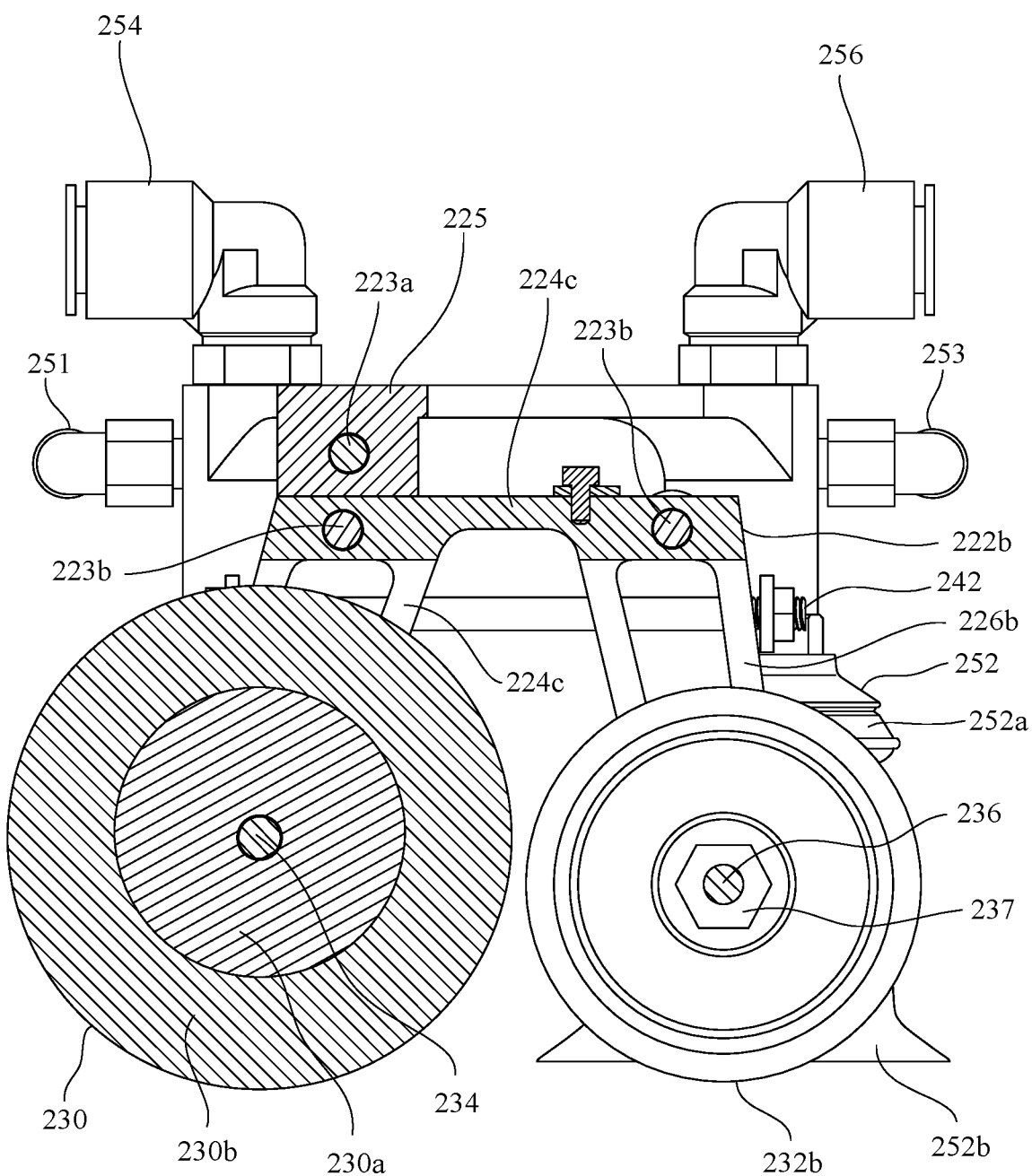
FIG. 10 is a cross-sectional view of the exemplary end effector of FIG. 8B.

FIGS. 8-10 are various views of the exemplary end effector 220 of FIG. 7, but with certain components hidden from view to better illustrate features of the end effector 220.

Referring now to FIGS. 7-10, the exemplary end effector 220 includes a frame 222 to which a first wheel 230 and a second wheel 232 are each mounted for rotation. The frame includes a base plate 224 configured for connection to the portion of the robot 112. In this exemplary embodiment, the end effector 220 further includes a bracket 225, which is directly connected to the portion of the robot 112 and to which the base plate 224 of the frame 222 is secured via one or more bolts 223a, although alternative fastening means may, of course, be used without altering the operating principle of the end effector 220. Thus, in this exemplary embodiment, the frame 222 is indirectly connected to the portion of the robot 112.

Referring still to FIGS. 8-10, the first wheel 230 and the second wheel 232 each have an outer surface 230', 232' for engaging a target parcel. To effectively grasp parcels in the manner described below, the first wheel 230 and the second wheel 232 are mounted to the frame 222 relative to each other, such that the outer surface 230' of the first wheel 230 and the outer surface 232' of the second wheel 232 are opposite of each other. The first wheel 230 and the second wheel 232 are each mounted below and spaced apart from the base plate 224 to prevent the base plate 224 from obstructing rotation of the respective wheels 230, 232. To this end, in this exemplary embodiment, the frame 222 further includes at least one pair of support arms 226, 228 to which the first wheel 230 and the second wheel 232 are mounted for rotation. In this exemplary embodiment, the frame 222 includes two pairs of support arms 226, 228: a first pair of support arms 226 including a first support arm 226a and a second support arm 226b; and a second pair of support arms 228 including a third support arm 228a and a fourth support arm 228b.

Each respective support arm 226a, 226b, 228a, 228b extends downwardly from the base plate 224 of the frame 222 and includes a proximal end located proximate to the base plate 224 and a distal end to which either the first wheel 230 or the second wheel 232 is rotatably mounted. In this exemplary embodiment, the first wheel 230 is rotatably mounted to the first support arm 226a and the third support arm 228a, and the second wheel 232 is rotatably mounted to the second support arm 226b and the fourth support arm 228b by a shaft 236 extending through the center of the second wheel 232 and between the second support arm 226b and the fourth support arm 228b. In this exemplary embodiment, the second wheel 232 is mounted to the shaft 236 using a shaft adapter 237. Each respective support arm 226a, 226b, 228a, 228b extends downwardly from the base plate 224 of the frame 222 to provide sufficient spacing between the base plate 224 of the frame 222 and the first and second wheel 230, 232 to permit rotation thereof. Of course, the first wheel 230 and the second wheel 232 can be mounted to the frame 222 in alternative manners without altering the operating principle of the end effector 220. For example, in some embodiments, the frame 222 can include a single pair of support arms, to which the first and second wheel 230, 232 are respectively mounted or, alternatively, a single bracket component extending downwardly from the base plate 224 to which both the first wheel 230 and the second wheel2 32 are mounted.

Referring still to FIGS. 7-10, in this exemplary embodiment, the frame 222 is defined by a first frame member 222a and a second frame member 222b. In this exemplary embodiment, each frame member 222a, 222b is secured to the bracket 225 via bolts 223a. As best shown in FIG. 9, the first frame member 222a includes a first base plate 224a from which the first support arm 226a and the second support arm 226b extend downwardly. Similarly, as best shown in FIGS. 8A-8B, the second frame member 222b includes a second base plate 224b from which the third support arm 228a and the fourth support arm 228b downwardly extend. Thus, the first frame member 222a and the second frame member 222b include the first pair of support arms 226 and the second pair of support arms 228, respectively. In this exemplary embodiment, the base plate 224 of the frame 222 is thus defined by the first base plate 224a of the first frame member 222a and the second base plate 224b of the second frame member 222b, in combination. Moreover, in this exemplary embodiment, the first frame member 222a and the second frame member 222b are each integrally formed, such that the base plate 224a, 224b and the support arms 226a, 226b, 228a, 228b of each respective frame member 222a, 222b form a unitary component. The base plate 224a, 224b and support arms 226a, 226b, 228a, 228b of each frame member 222a, 222b can, of course, in alternative embodiments, be separate components secured together via a bolted connection or some other fastening means, while still permitting the end effector 220 to engage parcels in the manner described herein. During operation, the first frame member 222a and the second frame member 222b are held in position adjacent to one another by bolts 223b extending through the respective frame members 222a, 222b. To this end, the first base plate 224a and the second base plate 224b of each frame member 222a, 222b defines two bores extending transversely therethrough to permit passage of the bolts 223b.

Referring still to FIGS. 7-10, the end effector 220 further includes a motor 230a configured to drive rotation of the first wheel 230. To reduce the overall size of the end effector 220, in this exemplary embodiment, the motor 230a is a hub motor integrated within the first wheel 230, such that the first wheel 230 includes a hub motor 230a and a wheel portion 230b that defines the outer surface 230' of the first wheel 230. The hub motor 230a is configured to drive rotation of the wheel portion 230b and is mounted to the first support arm 226a and the third support arm 228a via an axle 234 extending through the center of the hub motor 230a and between the first support arm 226a and the third support arm 228a. In order to drive rotation of the second wheel 232 as the hub motor drives 230a rotation of the wheel portion 230b of the first wheel 230, the outer surface 230' of the first wheel 230 is placed in contact with the outer surface 232' of the second wheel 232. As the hub motor 230a drives the wheel portion 230b of the first wheel in a first direction (e.g., counterclockwise), the contact between the outer surface 230' of the first wheel 230 and the outer surface 232' of the second wheel 232 causes the second wheel 232 to rotate in a second direction (e.g., clockwise) that is opposite of the first direction. The second wheel 232 can thus be slave-driven by the first wheel 230 to cause the first wheel 230 and the second wheel 232 to simultaneously rotate in opposite directions. As the flexible packaging material of a parcel contacts the outer surface 230', 232' of either the first wheel 230 or the second wheel 232, the parcel is urged toward the outer surface 230', 232' of the other wheel 230, 232. Because the first wheel 230 and the second wheel 232 are simultaneously rotating in opposing directions, movement of the outer surfaces 230', 232' of the first and second wheel 230, 232 acts to pull the flexible packaging material upward and between the first wheel 230 and the second wheel 232. In this way, the first wheel 230 and the second wheel 232 effectively provide a roller intake, which can be used to draw the flexible packaging material of a parcel between the first wheel 230 and the second wheel 232.

As the flexible packaging material of the parcel is drawn upwardly and between the first wheel 230 and the second wheel 232, the flexible packaging material of the parcel is effectively pinched, and thus grasped, by the end effector 220. Once the parcel is so grasped by the end effector 220, robot carrying the end effector 220 can be manipulated to transport the parcel to a target destination. Upon reaching the target destination, the rotation of the first wheel 230 and the second wheel 232 can be reversed to release the parcel. In this regard, the hub motor 230a can be engaged to rotate the first wheel 230 in the opposite direction (i.e., the second direction or clockwise in the above example). Again, as a result of the contact between the outer surface 230' of the first wheel 230 and the outer surface 232' of the second wheel 232, this also causes the second wheel 232 to rotate in the opposite direction (i.e., the first direction or counterclockwise in the above example). To permit rotation of the first wheel 230 in both directions (counterclockwise and clockwise), the hub motor 230a is, preferably, a bi-directional motor. Referring now to FIG. 9, certain components of the end effector 220 have been hidden from view to better illustrate features of the end effector 220. As shown in FIG. 9, in this exemplary embodiment, in order to provide additional surface area to grip a target parcel, the second wheel 232 is composed of a plurality of sub-wheels 232a, 232b, 232c. More specifically, in this exemplary embodiment, the second wheel 232 is comprised of three sub-wheels 232a, 232b, 232c, each having an outer surface for engaging a parcel. Thus, in this exemplary embodiment, the outer surfaces of the sub-wheels 232a, 232b, 232c collectively define the outer surface 232' of the second wheel 232 for engaging a parcel. To prevent friction between adjacent sub-wheels 232a, 232b, 232c, the sub-wheels 232a, 232b, 232c of the second wheel 232 are preferably spaced apart from one another about the shaft 236. The sub-wheels 232a, 232b, 232c defining the second wheel 232 are fixed to the shaft 236, such that the sub-wheels 232a, 232b, 232c associated with the shaft 236 rotate in unison with each other. In some embodiments, each sub-wheel 232a, 232b, 232c may be made from a compliant material, such as polyurethane with a shore A30 hardness, which will deform in the response to pressure to better permit the flexible packaging materials of a target parcel to be drawn between the first wheel 230 and the second wheel 232 during operation.

Referring now again to FIGS. 7-10, to adjust the spacing between the support arms 226a, 228a supporting the first wheel 230 and the support arms 226b, 228b supporting the second wheel 232, and thus the spacing between first wheel 230 and the second wheel 232, the end effector 220 further includes one or more tensioning rods 240, 242. Specifically, in this exemplary embodiment, the end effector 220 includes two tensioning rods 240, 242: a first tensioning rod 240, which can be tightened or loosened to regulate the spacing between the first support arm 226a and the second support arm 226b; and a second tensioning rod 242, which can be tightened or loosened to regulate the spacing between the third support arm 228a and the fourth support arm 228b. The first support arm 226a and the second support arm 226b each have a bore extending transversely therethrough to permit passage of the first tensioning rod 240, as shown in FIG. 10. Similarly, the third support arm 228a and the fourth support arm 228b each have a bore extending therethrough to permit passage of the second tensioning rod 242.

FIGS. 8A and 8B, respectively, show the end effector 220 in a first configuration in which the first and second tensioning rods 240, 242 are both tightened and in a second configuration in which the first and second tensioning rods 240, 242 are both loosened. As perhaps shown best by comparing FIGS. 8A and 8B, by tightening the first and second tensioning rods 240, 242, the first support arm 226a (not shown in FIGS. 8A and 8B) and the third support arm 228a can be drawn towards the second support arm 226b (not shown in FIGS. 8A and 8B) and the fourth support arm 228b, respectively, to cause the outer surface 230' of the first wheel 230 and the outer surface 232' of the second wheel 232 to contact each other.

Referring now to FIG. 8A, to permit the respective support arms 226a, 226b, 228a, 228b of each frame member 222a, 222b to move closer to one another, the base plate 224a, 224b of each frame member 222a, 222b includes a central portion 224c, 224d configured to flex in response to tensioning of the tension rods 240, 242. As shown in FIG. 8A, when the second tensioning rod 242 is tightened causing the third support arm 228a and the fourth support arm 228b of the second frame member 222b to draw closer to one another, the central portion 224d of the second base plate 224b bends to account for the decreased spacing between the third support arm 228a and the fourth support arm 228b. Although not visible in FIG. 8A, when the first tensioning rod 240 is tightened causing the first support arm 226a and the second support arm 226b of the first frame member 222a to draw closer to one another, the central portion 224c of the first base plate 224a similarly bends to account for the decreased spacing between the first support arm 226a and the second support arm 226b. In this way, the central portion 224c of the first base plate 224a and the central portion 224d of the second base plate 224b serve as flexion points for the first frame member 222a and the second frame member 222b, respectively.

Referring now to FIGS. 7-10, to permit flexing of the respective frame members 222a, 222b in the above-described manner, the thickness of the central portion 224c of the first base plate 224a is preferably less than the remaining portions of the first base plate, and the central portion 224d of the second base plate 224b is preferably less than that of the remaining portions of the second base plate 224b. Further, to this end, the first frame member 222a and the second frame member 222b are each preferably constructed of a resilient material, such that when the first and second tension rods 240, 242 are loosened, the central portion 224c, 224d of the first base plate 224a and the second base plate 224b uncurls from a bended configuration to retain a substantially straightened configuration, as shown in FIGS. 7, 8B, and 9-10. In this exemplary embodiment, the first frame member 222a and the second frame member 222b are each constructed of a plastic material. It should be appreciated, however, that the first and second frame members 222a, 222b may be constructed in alternative manners, and of alternative materials, to permit the first and third support arms 226a, 228a to move closer to the second and fourth support arms 226b, 228b in response to the tensioning of the tension rods 240, 242. For example, in alternative embodiments, the central portion 224c, 224d of first and second base plates 224a, 224b may each be defined by a hinge.

Referring now to FIGS. 7, 8B, and 9-10, the first and second tensioning rods 240, 242 can be loosened to adjust the spacing between the first wheel 230 and the second wheel 232 to release the parcel. Thus, in this regard, it is not always necessary for the outer surface 230' of the first wheel 230 to be placed in direct contact with the outer surface 232' of the second wheel 232. In FIGS. 7, 8B, and 9-10 a gap exists between the first wheel 230 and the second wheel 232 as a result of the first tensioning rod 240 and the second rod 242 being loosened, though such gap is only discernible in FIGS. 8B and 10 due to the views presented in FIGS. 7 and 9. Thus, a gap can be maintained between the first wheel 230 and the second wheel 232, but the end effector 220 will still function as intended, as, when the flexible packaging materials of a parcel are pulled upward by the rotation of the first wheel 230 alone, and when the flexible packaging material enters the gap between the first wheel 230 and the second wheel, the second wheel 232 will start to rotate in the opposite direction.

Referring now to FIGS. 7-10, to detect the proximity of parcels relative to the end effector 220, in this exemplary embodiment, the end effector 220 further includes one or more sensors 260, 262. Specifically, the end effector 220 includes: a first sensor 260 and a second sensor 262, each of which is configured to detect the presence of a parcel. The first sensor 260, like the first sensor 60 of the end effector 10 described above with reference to FIGS. 1-5, is configured to detect the presence of a parcel positioned along a first, horizontal axis extending generally parallel to a bottom surface of the frame 222. The second sensor 262, the second sensor 62 of the end effector 10 described above with reference to FIGS. 1-5, is configured to detect the presence of a parcel positioned along a second, vertical axis extending generally perpendicular to the bottom surface of the frame 222. In this exemplary embodiment, the first sensor 260 is mounted to the third support arm 228a of the second pair of support arms 228 via a first sensor bracket 264 at a position sufficient to detect the presence of a parcel when positioned between the first wheel 230 and the second wheel 232. The second sensor 262, in this exemplary embodiment, is mounted to the bracket 225 interconnecting the frame 222 and the portion of the robot 112 via a second sensor bracket (not shown) at a position sufficient to detect the presence of a parcel positioned below the end effector 220 in the area where the second sensor 262 is mounted. Of course, the first sensor 260 and the second sensor 262 can be mounted in alternative arrangements, e.g., the second sensor 262 can be directly or indirectly mounted to the frame 222, and still enable the end effector 220 to function as intended.

Referring still to FIGS. 7-10, in this exemplary embodiment, the first sensor 260 and the second sensor 262 are both photoelectric sensors, such as visible light sensors, configured to emit a beam of visible or infrared light to detect the presence of a parcel, though other suitable proximity sensors, such as an ultrasonic sensor, can alternatively be used. The first sensor 260 and the second sensor 262 may serve as individual components of, and acquire environmental input data for, a control subsystem (as further described below with reference to FIGS. 11 and 12).

Referring now FIGS. 7, 8A, 8B, and 10, as a further refinement, in this exemplary embodiment, the end effector 220 further includes a first vacuum cup 250 and a second vacuum cup 252 for engaging cardboard boxes or other parcels with rigid packaging materials. As such, the first vacuum cup 250 and the second vacuum cup 252 effectively provide the end effector 220 with a secondary means of grasping parcels. Each vacuum cup 250, 252 is connected to the bracket 225 that is configured to interconnect the frame 222 and the portion of the robot 112 and includes a bellows 250a, 252a having a proximal end connected to the bracket 225 and a distal end to which a lip 250b, 252b of the vacuum cup 250, 252 is connected. The bellows 250a, 252a each effectively define a pathway for the flow of air through the respective vacuum cups 250, 252.

Referring still to FIGS. 7, 8A, 8B, and 10, in this exemplary embodiment, the end effector 220 further includes a first connector 254 corresponding to the first vacuum cup 250 and a second connector 256 corresponding to a second vacuum cup 252. Each connector 254, 256 is in fluid communication with the bellows 250a, 252a of the respective vacuum cup 250, 252 to which it corresponds and is configured to connect to a vacuum source (not shown) via a vacuum hose (not shown) to provide suction through the corresponding vacuum cup 250, 252. In this way, the connectors 254, 256 can be selectively connected or disconnected from a vacuum source to independently turn on or off, and thus individually address, the vacuum cups 250, 252. In this exemplary embodiment, the bracket 225 further defines a first port 227*a* which interconnects the first vacuum cup 250 and the first connector 254, and a second port 227*b* which interconnects the second vacuum cup 252 and the second connector 256.

In some embodiments, the end effector 220 may utilize a vacuum sensor (not shown) corresponding to each vacuum cup 250, 252. To this end, and referring now to FIGS. 7-10, the end effector 220 can include a first sensor port 51 corresponding to the first vacuum cup 250 and a second sensor port 253 corresponding to the second vacuum cup 252. Each sensor port 251, 253 is in fluid communication with the vacuum cup 250, 252 to which it corresponds and is configured to operably connect to a vacuum sensor.

Figure 11:
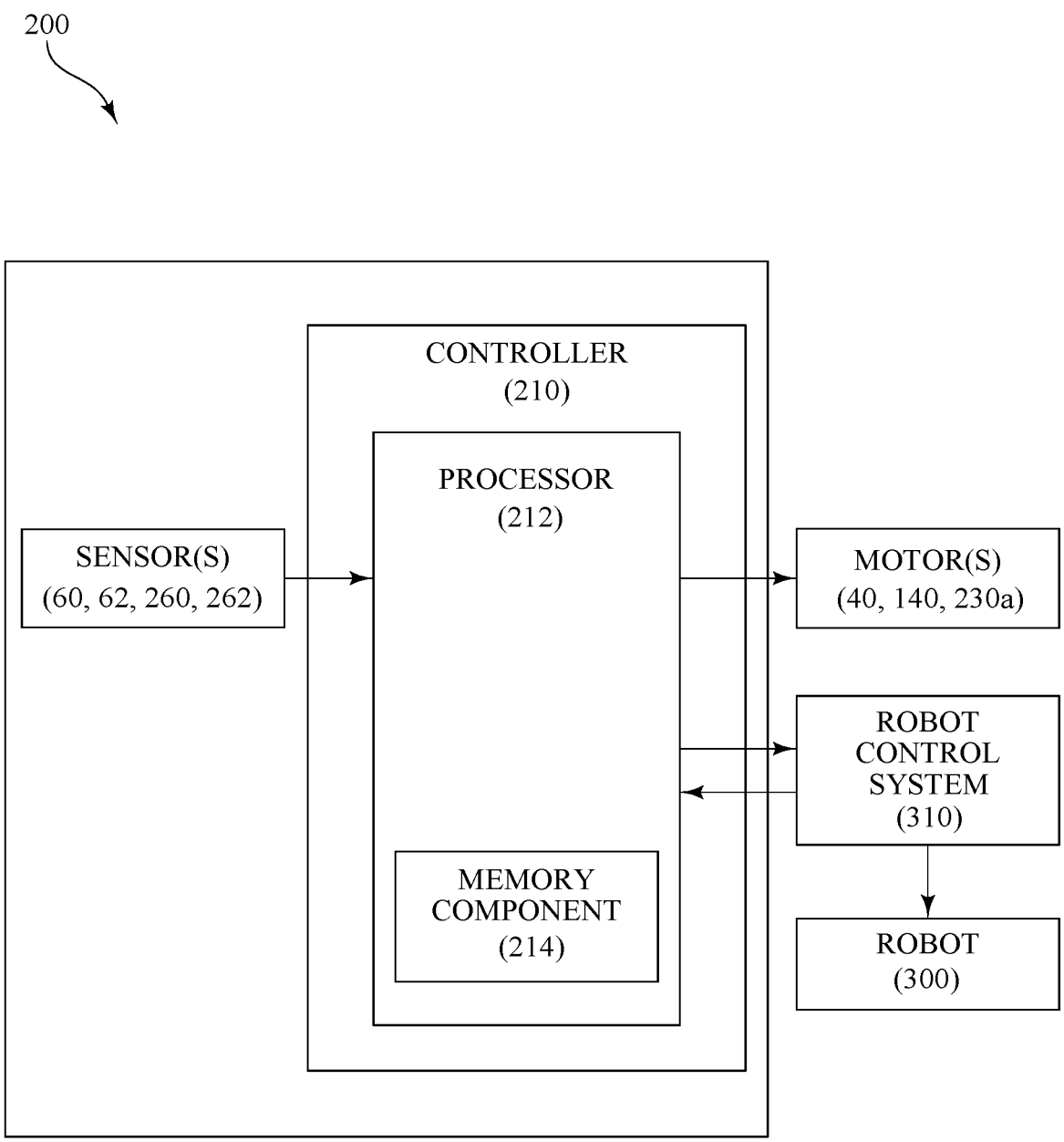
FIG. 11 is a schematic diagram of a control subsystem and a robot control system for a system that includes an end effector made in accordance with the present invention.

FIG. 11 shows a schematic diagram of a control subsystem 200, which can be utilized with each of the above-described end effectors 10, 110, 220 for engaging the flexible packaging materials of parcels to regulate motor 40, 140, 230*a* engagement. As shown in FIG. 11, the control subsystem 200 includes each sensor 60, 62, 260, 262 of the end effector 10, 110, 220 to collect environmental data regarding the proximity of parcels relative to the end effector 10, 110, 220. The data gathered by each sensor 60, 62, 260, 262 can be in the form of a binary signal, which indicates whether a parcel is present along the axis which the sensor 60, 62, 260, 262 is configured to monitor. For instance, in embodiments where each 60, 62, 260, 262 is a photoelectric sensor, upon contacting the beam of visible or infrared light emitted from the sensor 60, 62, 260, 262, the sensor may be "triggered" and be configured to communicate a "TRUE" or "ON" signal indicating that a target parcel is present. The control subsystem 200 further includes a controller 210 operably connected to each sensor 60, 62, 260, 262 of the end effector 10, 110, 220, such that the data collected by the sensors 60, 62, 260, 262 is transmitted as input to the controller 210 for subsequent processing. The controller 210 includes a processor 212 for executing instructions (routines) stored in a memory component 214 or other computer-readable medium. The controller 210 is also operably connected to each motor 40, 140, 230*a* of the end effector 10, 110, 220, such that the controller 210 can communicate instructions which cause each motor 40, 140, 230*a* to either drive or cease rotation of the wheel 30, 32, 230 to which the motor 40, 140, 230*a* is operably connected.

Figure 12:
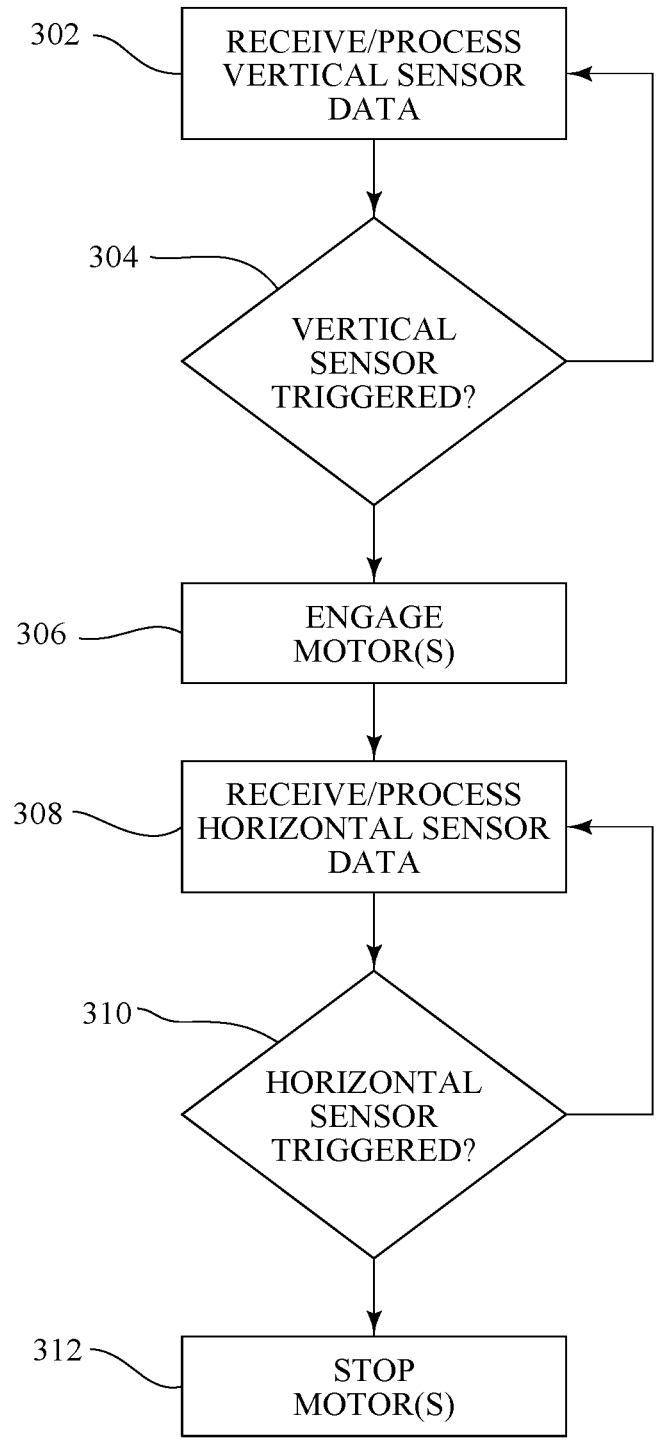
FIG. 12 is a flow diagram of an method for regulating motor engagement.

FIG. 12 is a flow diagram of a method for regulating engagement of each motor 40, 140, 230*a* of the end effector 10, 110, 220, which uses the control subsystem 200 of FIG. 11. In step 302, input data from the second sensor 62, 262 is received and processed by the controller 210 (see FIG. 11). In step 304, based on the input data received from the second sensor 62, 262, the controller 210 determines whether a target parcel is positioned beneath the end effector 10, 110 210. If the controller 210 determines a target parcel is positioned beneath the end effector 10, 110, 220, the controller 210 will communicate instructions to each motor 40, 140, 230*a* of the end effector 10, 110, 220, in step 306, which causes the motor 40, 140, 230*a* to engage and drive rotation of the wheel 30, 32, 230 to which it is operably connected. Conversely, if the controller 210 determines a target parcel is not positioned under the end effector 10, 110, the controller 210 will standby until subsequent input data is received from the second sensor 62, 262, at which time step 302 will be repeated.

Referring still to FIG. 12, once each motor 40, 140, 230*a* of the end effector 10, 110, 220 is engaged, in step 308, input data from the first sensor 60, 260 of the end effector 10, 110, 220 is then received and processed by the controller 210. In step 310, based on the input data received from the first sensor 60, 260, the controller 210 determines whether the flexible packaging material of a target parcel has been drawn up to a predetermined position between the first wheel 30, 230 and the second wheel 32, 232. If the controller 210 determines the flexible packaging material of the target parcel has been drawn between the first wheel 30, 230 and the second wheel 32, 232 to the predetermined position, the controller 210 will communicate instructions to each motor 40, 140, 230*a* of the end effector 10, 110, 220, in step 312, which causes the motor 40, 140, 230*a* to cease engagement to stop rotation of the wheel 30, 32, 230, 232 to which it is operably connected. In this way, the control subsystem 200 is configured to prevent a target parcel from being drawn entirely through the first wheel 30, 230 and the second wheel 32, 232. In this way, the control subsystem 200 can serve to protect target parcels from damage even if a worm gear motor is not utilized. In some implementations, the control subsystem 200 must first be initialized, e.g., by receiving a signal from a robot control system, as described below with reference to FIG. 11, before input data can be received from the first sensor 60, 260 and/or the second sensor 62, 262 and subsequently processed to prevent inadvertent engagement of the motors 40, 140, 230.

If the controller 210 determines that the flexible packaging material of a target parcel has not been drawn between the first wheel 30, 230 and the second wheel 32, 232 to the predetermined position, the controller 210 will standby until subsequent input data is received from the second sensor 62, 262, at which time step 308 will be repeated. Thus, in this implementation, each motor 40, 140, 230*a* of the end effector 10, 110, 220 is engaged when the second sensor 62, 262 is triggered and subsequently stopped when the first sensor 60, 260 is triggered.

Referring now again to FIG. 11, as a further refinement to the present invention, in this exemplary embodiment, the controller 210 of the control subsystem 200 and a robot 300 to which a selected end effector 10, 110, 220 is mounted are operably interconnected by a robot control system 310 configured to control movement of the robot 300. The robot control system 310 can include a motor control system and a computer, such as the motor control system and computer described in the vision and control subsystem of U.S. Patent Application Publication No. 2018/0345324, which has been incorporated herein by reference. The control subsystem 200 and the robot control system 310 are operably connected, such that the control subsystem 200 communicates signals to the motor control system 310 indicative of whether a parcel has been detected and whether the end effector 10, 110, 220 has grasped a parcel. In turn, such signals ultimately inform the manner in which the robot 300 to which the end effector 10, 110, 220 is mounted is moved.

Referring still to FIG. 11, in some implementations, the process of engaging a target parcel begins by the robot control system 310 moving the robot 300 carrying the selected end effector 10, 110, 220 to area in in which a target parcel is located. To assist the robot control system 310 in identifying the general area in which a parcel is located, in some embodiments, the control subsystem 200 and/or the motor control system 310 can be further operably connected to one or more cameras, such as those described in the vision and control subsystem of U.S. Patent Application Publication No. 2018/0345324, which captures two-dimensional and/or three-dimensional image data corresponding to parcel location. Upon triggering of the second sensor 62, 262, the control subsystem 200 can communicate a signal to the robot control system 310 indicating that a parcel has been detected, in addition to engaging each motor 40, 140, 230 of the end effector 10, 110, 220. Upon receiving such signal, the robot control system 310 causes the robot 300 and, thus, the end effector 10, 110, 220 mounted thereto to be lowered onto the parcel.

Referring still to FIG. 11, when the first sensor 60, 260 is triggered, the control subsystem 200 can communicate a signal to the robot control system 310 indicating that the end effector 10, 110, 220 has effectively grasped a parcel. Upon receiving such signal, the robot control system 310 causes the robot 300 to transport the end effector 10, 110, 220 grasping the parcel to an intended destination. Upon reaching the intended destination, the robot control system 310 can communicate a signal to the control subsystem 200, which, when processed thereby, causes the control subsystem 200 to communicate instruction to each motor 40, 140, 230a of the end effector 10, 110, 220 that causes each motor 40, 140, 230a to drive the wheel 30, 32, 230, 232 to which the motor 40, 140, 230a is associated in the opposite direction as used to initially grasp the parcel. Thus, in some embodiments, the control subsystem 200 and the robot control system 310 are operably connected such that the robot control system 310 can communicate signals to the control subsystem 200, which ultimately inform operation of each motor 40, 140, 230 of the end effector 10, 110, 220. After the parcel is released, the control subsystem 200 can then communicate a signal to the robot control system 310 indicating that a parcel is no longer grasped by the end effector 10, 110, which causes the robot control system 310 to reposition the robot 300 and subsequently grasp another parcel in the above-described manner.

One of ordinary skill in the art will recognize that additional embodiments and implementations are also possible without departing from the teachings of the present invention. This detailed description, and particularly the specific details of the embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. An end effector for a robot, comprising:
    a frame, including
        a base plate,
        a first pair of support arms, each respective support arm of the first pair of support arms secured to and extending downwardly from the base plate, and
        a second pair of support arms positioned opposite of the first pair of support arms, each respective support arm of the second pair of support arms secured to and extending downwardly from the base plate;
    a first wheel mounted between one support arm of the first pair of support arms and one support arm of the second pair of support arms for rotation with respect to the frame in a first direction, the first wheel having a first outer surface for engaging a parcel; and
    a second wheel mounted between the other support arm of the first pair of support arms and the other support arm of the second pair of support arms for rotation with respect to the frame in a second direction opposite the first direction, the second wheel having a second outer surface for engaging the parcel and being positioned relative to the first wheel, such that the first outer surface and the second outer surface are opposite of each other.

2. The end effector as recited in claim 1, and further comprising a motor operably connected to at least one of the first wheel and the second wheel.

3. The end effector as recited in claim 2, wherein the motor comprises a hub motor.

4. The end effector as recited in claim 2, wherein the motor comprises a first motor operably connected to the first wheel and a second motor operably connected to the second wheel.

5. The end effector as recited in claim 4, wherein the first motor is configured to drive the first wheel in the first direction and the second motor is configured to drive rotation of the second wheel in the second direction.

6. The end effector as recited in claim 2, wherein the first outer surface and the second outer surface contact one another.

7. The end effector as recited in claim 1, wherein the frame comprises a first frame member and a second frame member, the first frame member including the first pair of support arms and the second frame member including the second pair of support arms.

8. The end effector as recited in claim 1, and further comprising one or more sensors for detecting a presence of the parcel relative to the end effector.

9. The end effector as recited in claim 8, wherein the one or more sensors comprises at least one of a photoelectric sensor and an ultrasonic sensor.

10. The end effector as recited in claim 1, and further comprising a vacuum cup connected to the frame and configured to be placed in fluid communication with a vacuum source.

11. The end effector as recited in claim 1, wherein at least one of the first wheel and the second wheel comprises a plurality of sub-wheels.

12. An end effector for a robot, comprising:
    a frame, including
        a base plate, and
        a pair of support arms, each respective support arm of the pair of support arms secured to and extending downwardly from the base plate;
    a first wheel mounted for rotation with respect to one of the support arms of the pair of support arms in a first direction, the first wheel having a first outer surface for engaging a parcel; and
    a second wheel mounted for rotation with respect to the other support arm of the pair of support arms in a second direction opposite the first direction, the second wheel having a second outer surface for engaging the parcel and being positioned relative to the first wheel, such that the first outer surface and the second outer surface are opposite of each other;
    wherein one or more support arms of the pair of support arms is adjustably secured to the base plate.

13. An end effector for a robot, comprising:
    a frame, including
        a base plate, and
        a pair of support arms, each respective support arm of the pair of support arms secured to and extending downwardly from the base plate;
    a first wheel mounted for rotation with respect to one of the support arms of the pair of support arms in a first direction, the first wheel having a first outer surface for engaging a parcel;
    a second wheel mounted for rotation with respect to the other support arm of the pair of support arms in a second direction opposite the first direction, the second wheel having a second outer surface for engaging the parcel and being positioned relative to the first wheel, such that the first outer surface and the second outer surface are opposite of each other; and a tensioning rod configured to adjust a spacing between the respective support arms of the pair of support arms.

14. The end effector as recited in claim 13, wherein the frame is configured to flex in response to tensioning of the tension rod.

15. A system for engaging parcels, comprising:
a robot; and
an end effector operably connected to the robot, the end effector including
a frame, including
a base plate,
a first pair of support arms, each respective support arm of the first pair of support arms extending downwardly from the base plate, and
a second pair of support arms positioned opposite of the first pair of support arms, each respective support arm of the second pair of support arms extending downwardly from the base plate,
a first wheel mounted between one support arm of the first pair of support arms and one support arm of the second pair of support arms for rotation with respect to the frame in a first direction, the first wheel having a first outer surface for engaging a parcel, and
a second wheel mounted between the other support arm of the first pair of support arms and the other support arm of the second pair of support arms for rotation with respect to the frame in a second direction opposite the first direction, the second wheel having a second outer surface for engaging the parcel and being positioned relative to the first wheel, such that the first outer surface and the second outer surface are opposite of each other.

16. The system for engaging parcels as recited in claim 15, wherein the end effector further includes a motor operably connected to at least one of the first wheel and the second wheel.

17. The system for engaging parcels as recited in claim 16, and further comprising:
one or more sensors; and
a controller operably connected to each of the one or more sensors and the motor, the controller including a processor for executing instructions stored in a memory component to (i) receive and analyze data received from the one or more sensors to detect parcel presence relative to the end effector, and (ii) communicate instructions to the motor which cause the motor to either drive or cease rotation of at least one of the first wheel and the second wheel.

18. The system for engaging parcels as recited in claim 17, wherein the one or more sensors comprises a first sensor configured to detect the presence of the parcel when positioned along a first axis and a second sensor configured to detect the presence of the parcel when positioned along a second axis, the first axis extending parallel to a bottom surface of the frame and the second axis extending perpendicular to the bottom surface of the frame.

19. An end effector for a robot, comprising:
a base plate configured for mounting to the robot;
a first support arm extending downwardly from the base plate;
a second support arm extending downwardly from the base plate;
a first wheel mounted to the first support arm and positioned below the base plate, wherein the first wheel is configured to rotate with respect to the first support arm in a first direction, and wherein the first wheel has a first outer surface for engaging a parcel, and
a second wheel mounted to the second support arm and positioned below the base plate, where the second wheel is configured to rotate with respect to the second support arm in a second direction opposite the first direction, the second wheel having a second outer surface for engaging the parcel and being positioned relative to the first wheel, such that the first outer surface and the second outer surface are opposite of each other.

20. The end effector as recited in claim 19, and further comprising:
one or more vacuum cups connected to and positioned below the base plate adjacent the first wheel and the second wheel, wherein each of the one or more vacuum cups is configured to be placed in fluid communication with a vacuum source.

21. The end effector as recited in claim 19, and further comprising:
a motor operably connected to at least one of the first wheel and the second wheel.

22. The end effector as recited in claim 19, and further comprising:
a first motor operably connected to and configured to drive the first wheel in the first direction; and
a second motor operably connected to and configured to drive rotation of the second wheel in the second direction opposite the first direction.

23. The end effector as recited in claim 19, wherein the second support arm is adjustably secured to the base plate to adjust spacing between the first outer surface of the first wheel and the second outer surface of the second wheel.

* * * * *